INVENTOR.
WALTER E. PEERY

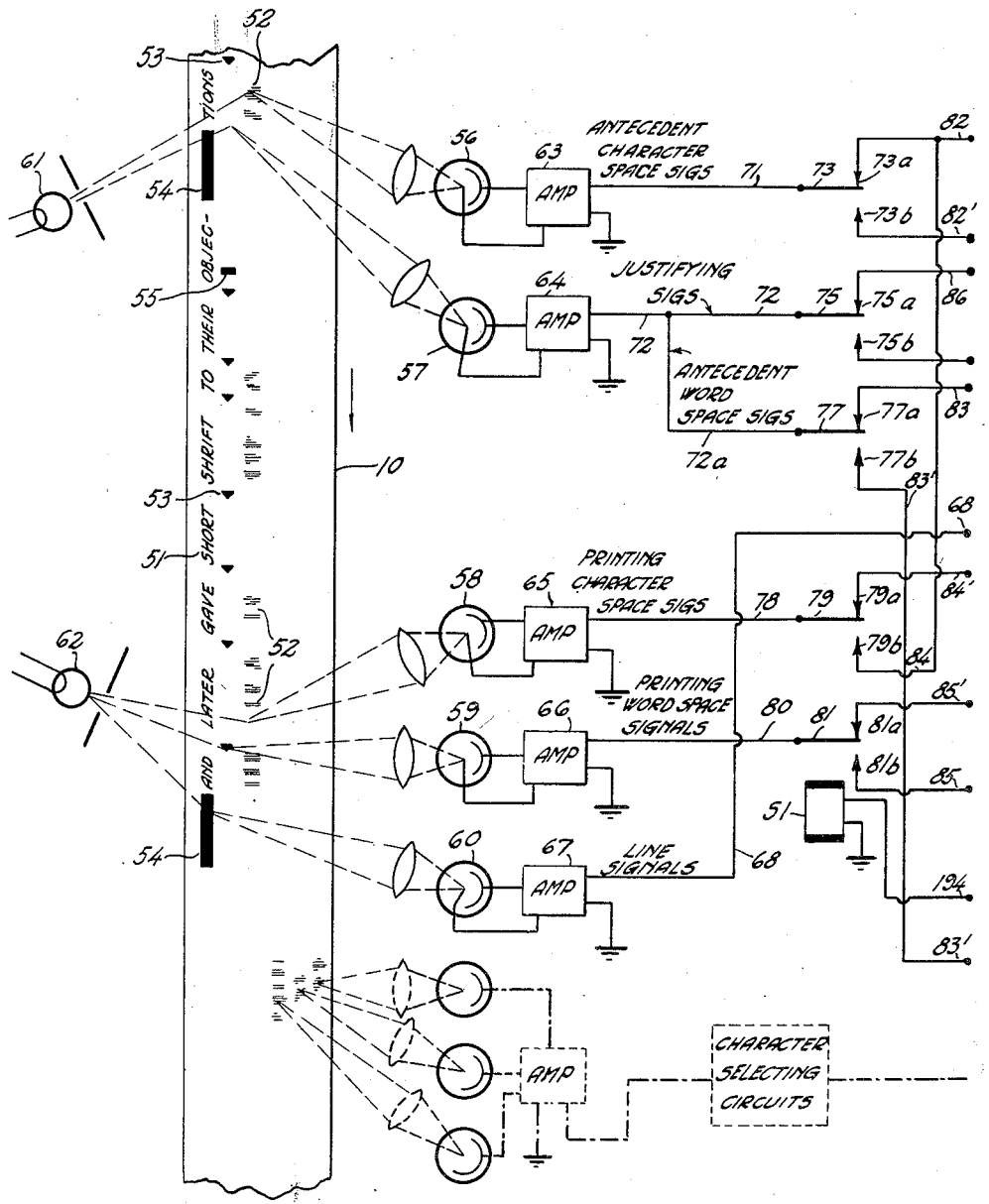
Fig.1.a
INVENTOR.
WALTER E. PEERY

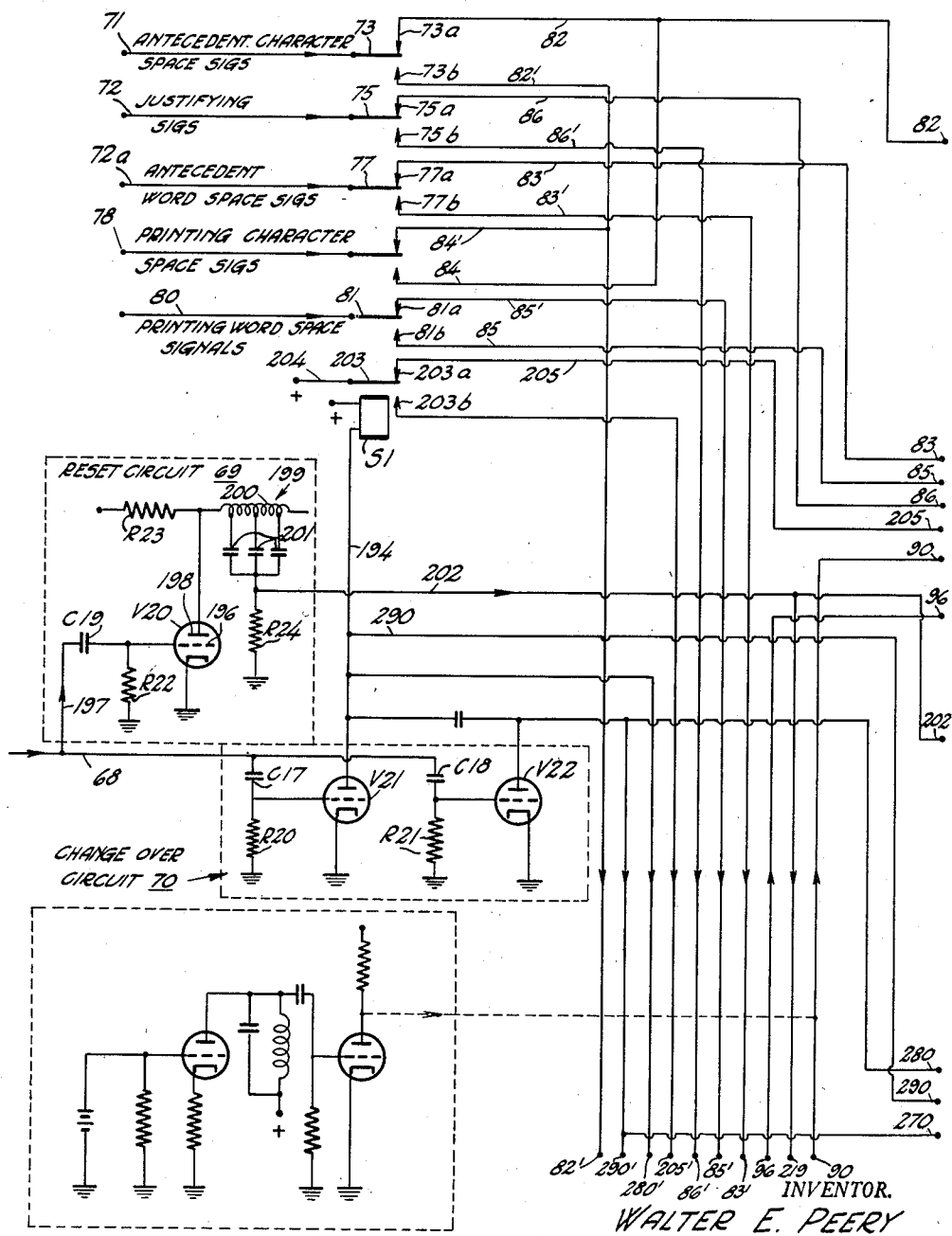

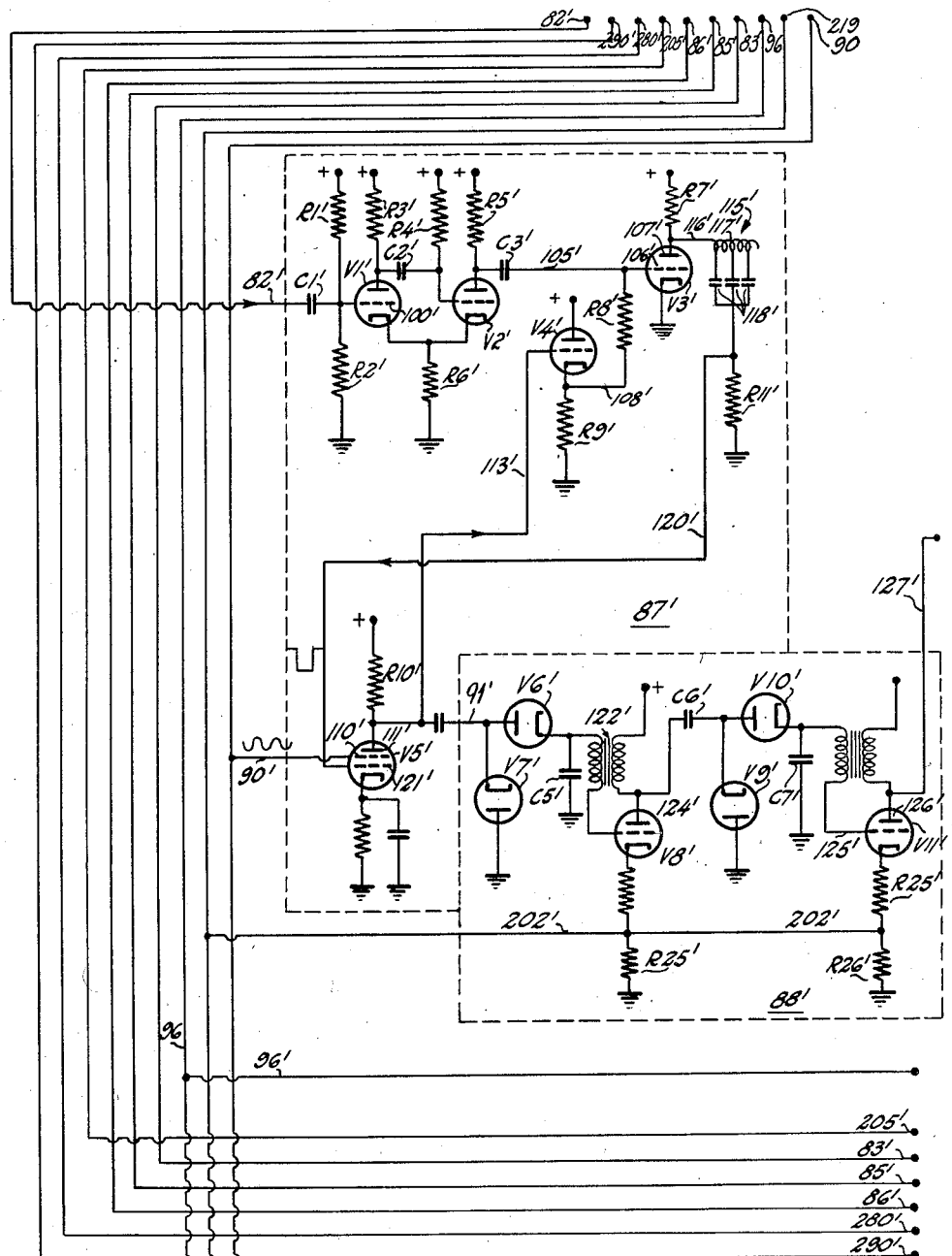

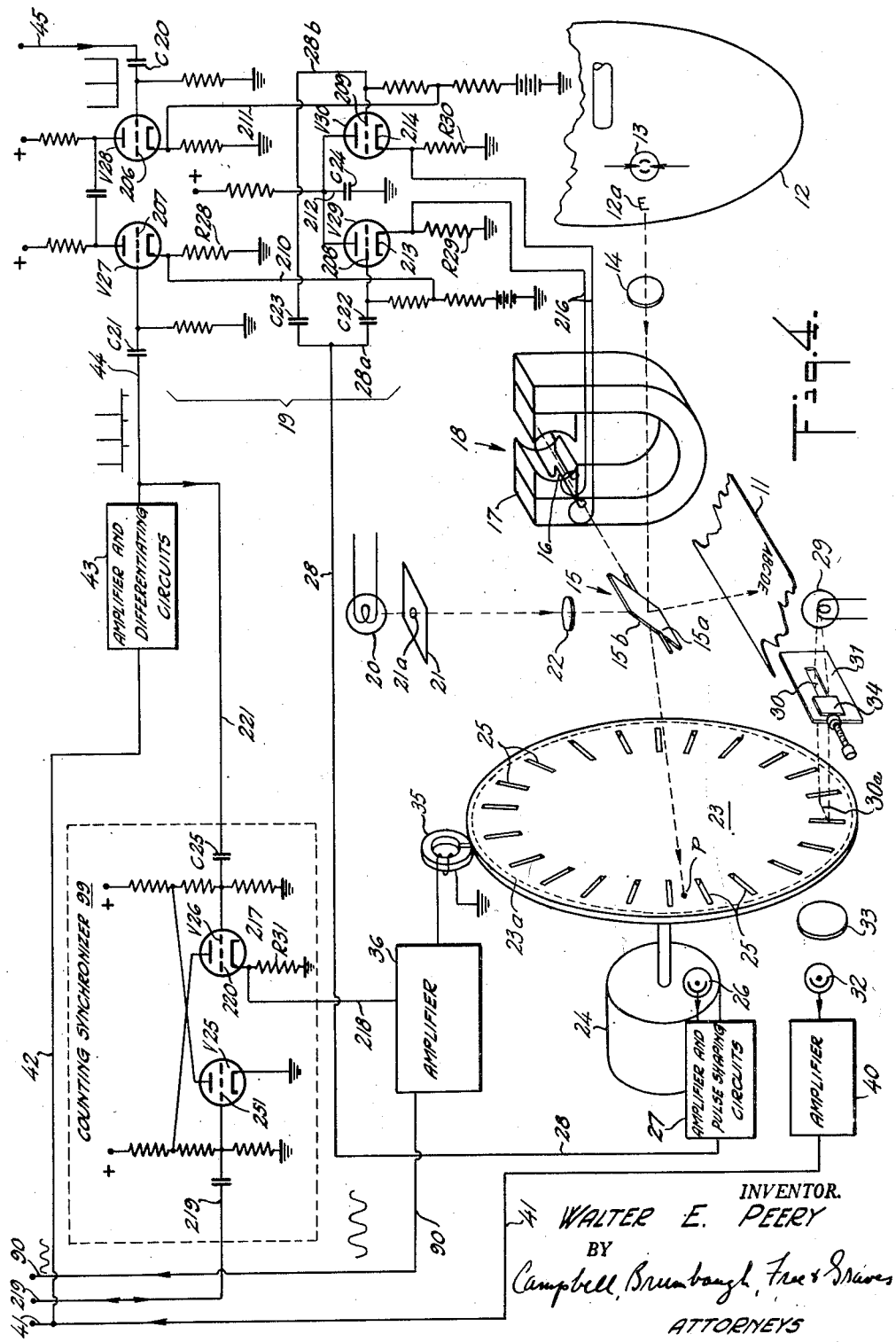

INVENTOR.
WALTER E. PEERY
BY
Campbell, Brumbaugh, Free & Graves
ATTORNEYS

United States Patent Office 2,786,400
Patented Mar. 26, 1957

2,786,400

JUSTIFYING AND CHARACTER POSITIONING APPARATUS FOR ELECTRONIC PHOTO-TYPE-COMPOSING SYSTEM

Walter E. Peery, Stamford, Conn., assignor to Time, Incorporated, New York, N. Y., a corporation of New York Application October 5, 1949, Serial No. 119,668

55 Claims. (Cl. 95—4.5)

The present invention relates to printing machinery and more particularly to photocomposing apparatus. More specifically, it has to do with a new and improved justifying and character positioning system for photocomposing apparatus, although it is not limited to such use.

The copending application Serial No. 41,318, filed July 29, 1948, by the same inventor, for Electronic Photocomposing System, discloses apparatus for automatically printing selected text materials in columns of justified lines on a photosensitive emulsion. The present application is addressed to a high speed justifying and character positioning system which is of exceptional utility in photocomposing apparatus of the type described and illustrated in the said copending application.

The principal object of the invention is to provide a new and improved character positioning system for photocomposing apparatus or the like, which is characterized by high speed, accuracy, and facility in operation.

Another object of the invention is to provide a new and improved character positioning system of the above character which includes means for automatically determining the correct spacing that must be inserted between words to insure that composition will be effected in properly justified lines.

Yet another object of the invention is to provide a new and improved character positioning system of the above character which can accommodate characters of different widths.

A further object of the invention is to provide a new and improved character positioning system of the above character having means for automatically inserting the correct word spacing for line justification as a line of type is being composed photographically.

Still another object of the invention is to provide a new and improved character positioning system of the above character which insures uniform spacing of words throughout the composed line.

Additional objects and advantages of the invention will be apparent from the following detailed description of the typical form thereof taken in conjunction with the accompanying drawings in which:

Figs. 1a, 1b and 1c, viewed side by side as one drawing comprise a flow diagram showing in block form the component circuits of a justifying and photocomposing system set up according to this invention;

Figs. 2a, 2b and 2c viewed side by side as one drawing comprise a schematic diagram of the electronic circuits adapted to perform the respective functions of positioning or composing a plurality of characters in a line and establishing the word spacing necessary to justify the line. Shown also in this figure are electronic circuits which perform a resetting operation to prepare the system for the composition of each new line, and which control the inputs to the circuits of Figs. 3a and 3b to alternate the functions thereof in a manner to be described;

Figs. 3a and 3b, viewed side by side as one drawing comprise a schematic diagram of electronic circuits duplicating those of Figs. 2b and 2c and electrically connected thereto as shown by placing Figs. 3a and 3b beneath Figs. 2a and 2b, respectively;

Fig. 4 is a drawing showing schematic circuits associated with the character positioning device and essential mechanical elements related thereto, the circuits of Fig. 4 being electrically connected to the circuits of Figs. 2a, 2b and 2c and 3a and 3b as shown by placing Fig. 4 beneath Figs. 3a and 3b;

For convenience, the invention will be described herein as adapted for use with an electronic photocomposing system of the type disclosed in the aforementioned copending application. Portions of the photocomposing system not necessary for an understanding of the present invention will not be described in detail herein, general reference being made to the said copending application for a disclosure of such matters.

Figure 1B:
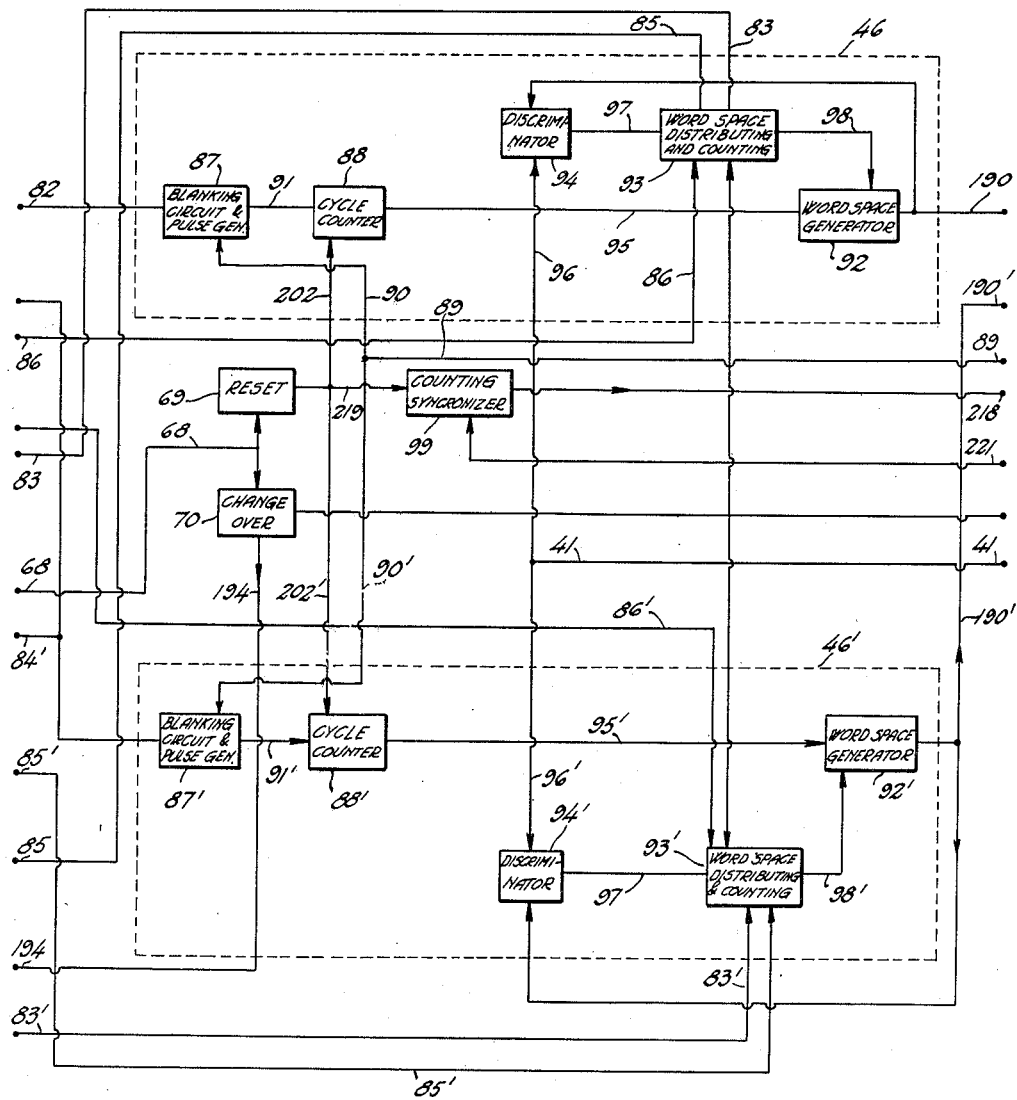
Figure 1C:
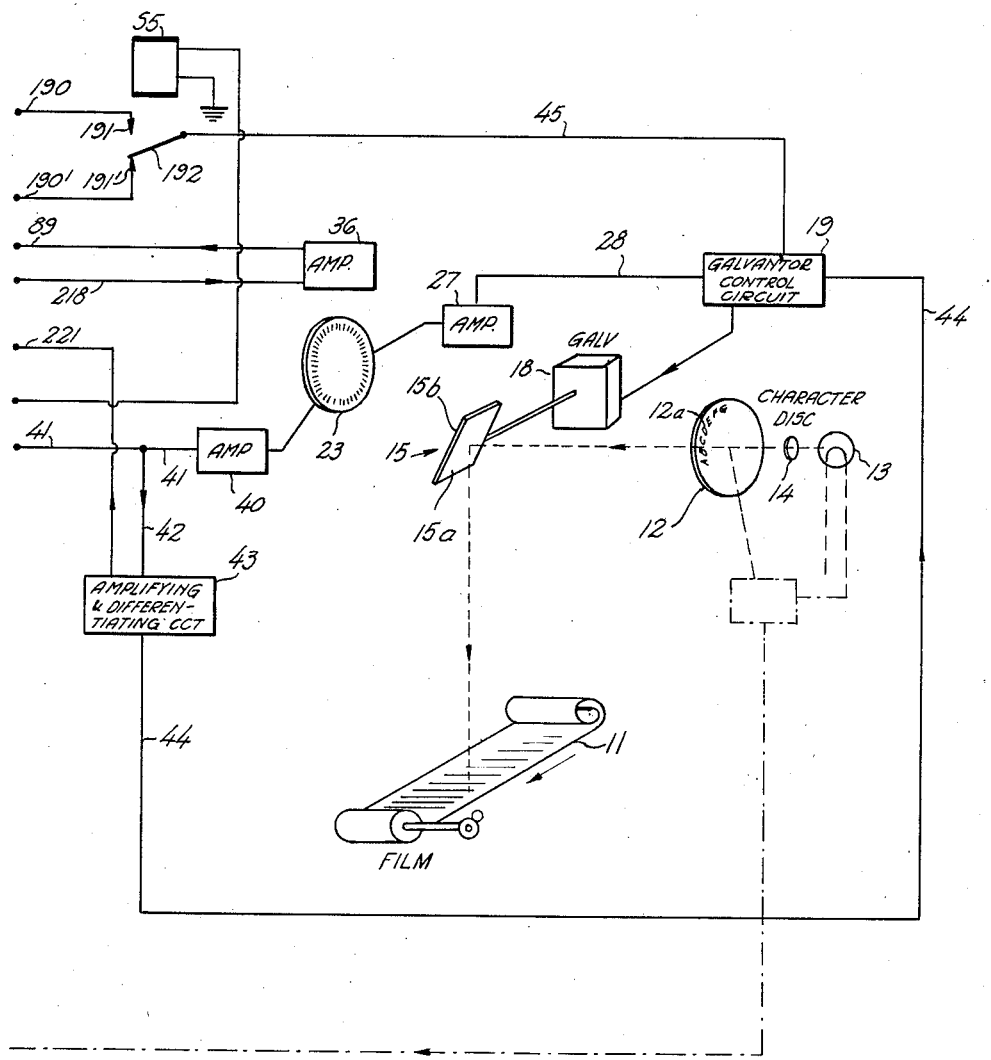

In a photocomposing system of the type selected for purposes of illustration, a control or code tape 10 (Fig. 1a) carries, in code form, characters in sequences to be printed ultimately on a photosensitized strip or film 11 (Fig. 1c). The portion of the system which governs the selection and printing of the characters forms no part of the present invention and it will not be described in detail herein. Suffice it to say that this part of the system acts in response to the coded characters on the tape to select for projection on the film 11 the successive characters to be printed; it is indicated in phantom in the flow diagram of Figs. 1a, 1b and 1c.

More specifically, the character printing apparatus includes a rotating character disk 12 which carries individual characters in the form of transparencies 12a spaced radially and circumferentially thereon. An optical system including a flashing lamp 13, a lens 14 and the reflecting surface 15a of a rotatable mirror element 15, conveys images of characters (formed by the transparencies 12a) to the photographic film 11 to be printed thereon.

The mirror 15 is rotated as the composition of a line progresses, thereby to position successively projected character images in desired space relationship upon the film 11. In the system disclosed in the aforementioned copending application, rotation of the mirror 15 is effected by a pawl and ratchet mechanism operated by an electronic control system responsive to other code indicia on the tape 10.

According to the present invention, the mirror 15 is rotated by an armature 16 disposed within pole pieces 17 of a galvanometer device 18 shown diagrammatically in Figs. 1 and 4. The armature 16 is adapted to be energized by electrical signals from a galvanometer control circuit 19 through the conductors 216, the direction of rotation of the armature 16, and consequently of the mirror 15 being dependent upon the direction of flow of current. The mirror 15 is thus rotated in either direction and in varying angular amounts depending upon the nature of the signal received from the galvanometer control circuit 19 in the form, for example, of negative and positive pulses, more fully described in the ensuing text under the subheading "VI. Galvanometer control circuits," to follow in this specification.

This invention, therefore, encompasses means for transposing coded information from the control tape 10 into signals suitable for controlling, for example, the projection of successively formed character images upon a photosensitized material in a preestablished pattern, which pattern, in the particular embodiment of the invention selected for purposes of illustration, comprises justified lines of characters forming columns having uniform marginal boundaries.

In accordance with the invention, the width of the column in which the characters are to be printed is represented by an electronic time base hereinafter termed "column width pulse" of commensurate length which is periodically swept out at a relatively high repetition rate. The actual position of the mirror 15 at any instant is given by a short electric position signal hereinafter called the "position pulse" having the same repetition rate as the time base or column width pulse and whose phase with respect to the time base is a function of the instantaneous position of the mirror 15 with respect to its column beginning and column ending positions. For example, when the mirror 15 is in the column beginning and column ending positions, respectively, the position signals occur simultaneously with the beginning and end of the time base, and correspondingly for any mirror position between the column beginning and column ending positions.

The position that the mirror should have for proper positioning of a character to be printed is represented by another relatively short electric signal designated the "guiding pulse" herein. The guiding pulse is derived from code indicia on the control tape 10 by an electronic circuit to be described later. Each relatively short guiding pulse, like each corresponding position pulse, occurs in time within the duration of a column width pulse of relatively long duration thereby to bear a particular time relationship thereto as indicative of position.

A suitable system for measurement or subdivision of the column width pulses to enable the respective positions of the guide and position pulses to be determined accurately as a function of time, is provided according to the invention and will be fully described later.

While the position pulses are indicative of the actual instantaneous positions of the mirror, the guiding pulses are indicative of the positions the mirror should have if the mirror 15 is to reflect the respective character images to their proper places on the film 11. Both the position pulses and the guiding pulses are introduced as inputs into the galvanometer control circuit 19 which is adapted to actuate the galvanometer device 18 to rotate the mirror to the angular positions demanded by the guiding pulses, as described. The mirror 15 is thus effectively made to follow the guiding pulses in the composition of each line of characters.

The means for justifying the lines of characters printed on the film 11 is incorporated in the guide pulse generating circuits. Briefly, the system measures, by an antecedent scanning system, the total length of each line of characters as a function of time. This measurement includes the spaces occupied by the characters themselves, hereinafter called "character spaces," as well as the spaces between successive words or groupings of characters, hereinafter called "word spaces."

The word spaces are utilized in the illustrated embodiment of the invention to effect justification of the lines. A standard word space is provided which is inserted between words if no justification of the line is required, such as when a paragraph ends in the middle of a line. If justification is required, as when a full line is to be composed, the system derives suitable word space values to bring the total line-length to its requisite dimensions.

Portions of the guide pulse generating circuits are duplicated in order that one of the duplicate circuits is available to perform the antecedent operation of measuring the next line to be composed and set itself up to insert the proper word spaces when its function is changed, by suitable switching means, to the composing or printing function. The other duplicated circuit, on the other hand, after printing a given line reverts to the antecedent function of "measuring" the line subsequent to that then being printed by the other circuit.

There follows under appropriate sub-headings a description of suitable means for developing the respective pulses defined above, as well as a description of the circuits utilizing these pulses to control the angular positions of the mirror 15. The sub-headings, in order, are:

I. Column width pulse generating system.
II. Position pulse generating system.
III. System for measuring the positions of the guide and position pulses within the column width pulses.
IV. Guide pulse generating system (general overall description).
IVa. Blanking and cycle counting circuits.
IVb. Word space delay generator circuits.
IVc. Word space counting and distributing circuits.
V. Function transferring and resetting circuits.
VI. Galvanometer control circuits.
VII. Synchronizing circuits.
VIII. Modification of word space delay generator.

I. *Column width pulse generator system (time base)*

(Fig. 4)

A pulse generating system is provided to supply the "time base" or column width information. This information may, according to the invention, be in the form of a succession of relatively long pulses, each having a time duration proportional to the width of the column. These column width pulses have a relatively high repetition rate, at least one pulse being provided for each character or character space among the several which comprise a given line.

A typical system for generating these pulses comprises a rotatably mounted timing disc 23 having a plurality, for example twenty-five, of equally angularly spaced radial slots 25 adjacent its periphery. The disc is rotated by a motor 24 at a given rate, 12,000 R. P. M. (200 R. P. S.) being selected for purposes of illustration herein.

A source of light 29 such as a lamp (Fig. 4) is disposed to pass a beam of light through a lengthwise adjustable slot 30 in a plate 31, thereby to produce a strip or ribbon of light having a width equal to the length of slot 30. The strip of light should impinge upon the timing disc 23 in a line 30a which is disposed transversely of the intercepting radial slot 25. Passing through the radial slot, the light is received in the form of a long pulse by a photo-electric cell 32 through a suitable lens system 33. Each pulse is of relatively long time duration, which is equal to the time of traverse of one radial slot 25 across the width of the strip of light. This pulse is set up as a function of the column width and is, as stated, termed the "column width pulse." An amplifier 40 may be provided for intensifying these pulses.

Means are provided for altering the duration of this column width pulse by changing the width of the strip of light by any suitable means such as a screw-adjusted cover plate 34 overlying the slot 30 in the plate 31.

Column width information is thus set up in terms of time by means of relatively long pulses of adjustable duration having a frequency or repetition rate of 5,000 per second.

It should be noted that the width of the strip of light impinging on the discs 25 in the line 30a should in all cases be equal to or less than the chord distance between adjacent radial slots 25 to prevent overlapping of successive column width pulses.

The column width pulses from the photo-electric cell 32 are fed into the galvanometer control circuit 19 through a circuit including the amplifier 40, a conduit 41, a conduit 42, a second amplifier and differentiating circuit 43, and a conduit 44.

A useful time interval, hereinafter called the "column sweep period" may be derived from the column width pulses by measuring the time between the beginnings of two successive column width pulses. In the example set up for illustration, the column sweep period would be 200 microseconds, also having a frequency rate of 5,000.

II. *Position pulse generating system*

Position pulses may be provided according to this invention by utilizing a second mirrored surface 15b (Fig. 4) on the mirror 15 to reflect a beam of light generated from a suitable source 20. The beam of light travels from the source 20, through an aperture 21a in a plate 21, through a lens system 22 to the surface 15b of the mirror 15, and thence to the surface of the timing disc 23 at a point p.

The slots 25 of the rotating disc 23 cross the beam of light reflected from the mirrored surface 15b, thereby causing intermittent flashes of light to be transmitted to a photo-electric cell 26. With each of the twenty-five radial slots intercepting the light beam at a rate of 200 per second, the photoelectric cell 26 receives 5,000 flashes of light per second, and therefore generates 5,000 electrical pulses per second, each being of relatively short duration as determined by the narrow width of the slots 25. These pulses as developed in the photocell 26 and intensified by an amplifier 27, are termed "position pulses" and are fed into the galvanometer control circuit 19 by a conduit 28.

III. *System for measuring the positions of the guide and position pulses within the column width pulses*

(Fig. 4)

Means are provided according to the invention for determining the respective positions of, or "timing" of corresponding position and guide pulses within a corresponding column width pulse. This is accomplished by establishing a relatively high frequency signal, herein called the "base frequency," whereby a relatively large number of cycles thereof are generated within the duration of each column width pulse.

The timing disc 23 may be utilized to provide this base frequency by providing a magnetic circumferential portion 23a upon which is magnetically recorded a succession of constant frequency sine-waves, an equal number, for example 200, being recorded between each pair of adjacent radial slots 25. Thus 5000 waves would be recorded in the entire timing disc.

A magnetic pick-up 35, disposed at the periphery of the disc, is adapted to have induced therein sine-wave signals at a rate of one million per second (200 R. P. S. × 5000). These signals may be amplified by an amplifier 36.

Assuming now that the column width pulse is adjusted to occupy, in time, three-fourths of the column sweep period (200 cycles of base frequency), there will be 150 cycles of base frequency in the duration of each column width pulse. Assigning a unit value of column width to each cycle, there is established a basis for measuring the column width time in terms of cycles of base frequency, and hence means for accurately measuring position across the column. The column width pulses, in the selected example, thus subtending 150 cycles of base frequency, the column width is divided into 150 parts.

As the mirror 15 is rotated through its range of movement and the point p of impingement of the light beam upon the disc consequently changed, the position pulses are made to occupy successively all time locations in the column width pulses, as can be seen from Fig. 4. By measuring the number of cycles of base frequency that elapse between the beginning of the column width pulse and the occurrence of the position pulse, the angular position of the mirror 15 can be accurately determined.

IV. *Guide pulse generating system*

The third and final series of signals or pulses introduced into the galvanometer control circuit 19 through a conductor 45 are the "guiding pulses." The guiding pulses, as stated, are a function of the code signals from the control tape 10, and are generated at any given moment in either one of two duplicate guide pulse generating circuits 46 and 46′ (Fig. 1b). These circuits are provided in duplicate in order that one can control the printing or composition of a line of characters on the film 11 by means of its output of guiding pulses while the other prepares for printing the next line, in which process it "stores" information to be utilized if the line requires justification.

As illustrated the guide pulse generating circuit 46′ is supplying guiding pulses to the galvanometer circuit 19, while the guide pulse generating circuit 46 is preparing for the justification of the next line. The functions of these two circuits are interchanged in a manner, later described, after each line has been composed. Consequently, in the flow diagram (Figs. 1a, 1b and 1c) the guide pulse generating circuit 46 will be switched to perform the printing or composing function for the next line, while the companion circuit 46′ will revert to preparation for the justification, if required, of the line following the next line.

The operation of the switching means provided for interchanging the functions of these two circuits will become apparent in the course of the detailed description under the sub-heading V entitled "Resetting circuits."

The guiding pulse is timed to take a position within a column width pulse to indicate, as a funtion of time, the position that the character corresponding thereto is to assume on the film 11. Each guiding pulse is compared in the galvanometer control circuit 19, with a corresponding position pulse, and if a time discrepancy exists between the two pulses, the mirror is rotated to bring the position pulse into coincidence with the guiding pulse as described.

The control tape 10 (Fig. 1a) carries information pertinent to character selection, word spacing, character spacing, line ending, and justification (if required). For convenience in proof reading the tape carries characters 51 as they will appear in print in the film 11. Aligned with each character 51 are indicia (not identified) pertaining to the character selection. The circuits identified by phantom lines in Fig. 1 are responsive to these indicia, in a manner fully disclosed in the aforementioned copending application, to actuate the flashing lamp 13 and character disc 12 in timed relationship.

Also aligned with each character 51 are indicia 52 pertinent to character spacings. These indicia appear in clusters of short lines, the number of lines in each cluster being proportional to the physical space the character corresponding thereto will occupy in the print on the film 11.

Triangularly shaped indicia 53 are provided at each word ending and wherever else desired to designate a space such as that required between words.

Rectangularly shaped indicia 54 of relatively long length are provided to denote the termination of a line of characters.

Indicia 55 are placed on the tape adjacent lines of characters which require justification. These indicia appear whenever the characters plus spaces of any line exceed a certain proportion of the line space, thereby to indicate justification is required. The coded indicia may be in the form of darkened areas which intercept a light beam traveling from its source to photoelectric cells to generate a pulse therein.

As the coded tape 10 travels through the scanning area, it passes two sets of photoelectric cells 56—57 and 58—59—60 respectively.

The cells 56 and 57, comprising the antecedent scanning means, are activated by a suitable light source 61. The cell 57 is aligned to be controlled by the indicia 53 and 55 relating to word spacing and justification It will be noted that the indicia 53 and 55 have different contours and thus cause pulses to be developed in the cell 57 possessing characteristics which are distinguishable by the circuits into which they are led through a common conduit 72. This effect is fully described in the above noted copending application and will not be described in detail herein.

The cell 56 is controlled by the indicia 52 relating to character spaces.

The cells 58, 59 and 60, activated from a suitable light source 62, are concerned with the printing or composing function. The cell 58 is controlled by the indicia 52; the cell 59 by the indica 53 and 55; and the cell 60 by the indicia 54 which indicate the end of each line.

The signals from the photoelectric cells 56, 57, 58, 59 and 60 are passed through the amplifiers 63, 64, 65, 66 and 67, respectively, before being fed into the guide pulse generating circuits 46 and 46'.

The amplified pulses from the photoelectric cell 60, called "line pulses," are fed by means of a conduit 68 directly to a reset circuit 69 (Fig. 1b) and to a changeover circuit 70, each serving a particular function to be described later.

The amplified pulses from the cell 56, termed "antecedent character space signals," are fed by means of a conduit 71 to the movable relay contact arm 73 of a relay S1, which is adapted to engage either of two fixed contacts 73a and 73b. The pulses from the cell 57, termed "antecedent word space signals," and "justifying signals," are led by the conduits 72a and 72, to the movable relay contact arms 77 and 75, respectively, of the relay S1. The contact arm 77 is adapted to engage either of two fixed contacts 77a and 77b while the contact arm 75 is adapted to engage either of two fixed contacts 75a and 75b. The pulses conducted to the contact arm 75 are termed "justifying signals," while those conducted to contact arm 77 are termed "antecedent word space signals." The justifying pulses, if any, pass from the movable contact 75 to contact 75a, and through a conduit 86 to a relay S4, the function of which will be described later.

Amplified pulses from the cell 58 termed "printing character space signals" and having their origin in the code markings 52 are led by a conduit 78 to the movable contact arm 79 of the relay S1 which is adapted to engage either of two fixed contacts 79a and 79b. Amplified pulses from the cell 59, termed "printing word space signals," are led by means of a conduit 80 to the movable contact 81 of the relay S1, which is adapted to engage either of two fixed contacts 81a and 81b.

With the relay S1 in the position shown in Fig. 1a the printing word space signals delivered at the relay movable contact arm 81 and the printing character space signals delivered at the relay movable contact arm 79 are fed to the guide pulse generating circuit 46' through the conduits 85' and 84', respectively. Hence, the guide pulse generating circuit 46' is performing the printing function and is, therefore, supplying guiding pulses to the galvanometer control circuit 19 through a circuit including conduit 190', engaged relay contacts 191' and 192 of a relay S5, and the conductor 45. The relay S5 controls the movable contact 192 to engage selectively either the fixed contact 191' or a second fixed contact 191, depending upon which of the guide pulse generating circuits 46 or 46' is to perform the composing function.

Meanwhile, the antecedent character space signals and antecedent word space signals delivered at the relay movable contact arms 73 and 77, respectively, are being fed to the guide pulse generating circuit 46 through the conduits 82 and 83, respectively. The circuit 46 utilizes these inputs to develop line justifying controls to be used in printing the line following that being printed by the circuit 46'.

In the following description, reference numerals will be assigned to the components of one (46) of the two duplicate guide pulse generating circuits, while like "primed" reference numerals will be applied to like components of the other (46').

The guide pulse generating circuit 46 includes a blanking circuit 87 connected by a conduit 91 to a cycle counting circuit 88. The blanking circuit 87 receives antecedent character space signals through the conductor 82 and base frequency pulses from the amplifier 36 through conduits 89 and 90. The cycle counter 88 receives the output of the blanking circuit through the conduit 91.

The output of the cycle counter 88 is a pulse which is positioned in the column width pulse in accordance with the cumulative character space signals received from control tape 10. This pulse will be referred to as the "totalized character space" pulse, hereinafter termed the "t. c. s." pulse. The cycle counter 88 counts each cycle of the base frequency supplied from the amplifier 36 and generates one short-duration t. c. s. pulse for each 200 cycles counted. The blanking circuit 87, however, causes one or more cycles of the base frequency to be obscured for each character space signal received from the control tape 10. The cycles obscured cause a gap in the counting, and hence delay the achievement of the total count of 200 necessary to establish a t. c. s. pulse by the number of cycles obscured.

If the t. c. s. pulses are timed initially to coincide with the beginning of a column width pulse, and then several cycles of the base frequency are blanked by the antecedent character space signals, the t. c. s. pulse will then lag the beginning of the column width pulse by the number of cycles blanked. When 150 cycles have been blanked the t. c. s. pulse will coincide with the ending of the column width pulse. The t. c. s. pulse can thus be described as moving along the column width pulse with its position being at all times proportional to the accumulated character space signals, and the accumulated space occupied by the characters in the line. The advancement of the t. c. s. pulse across the column width pulse is a matter of progressively delaying its occurrence with respect to the beginning of the column width pulse.

Figure 2B:
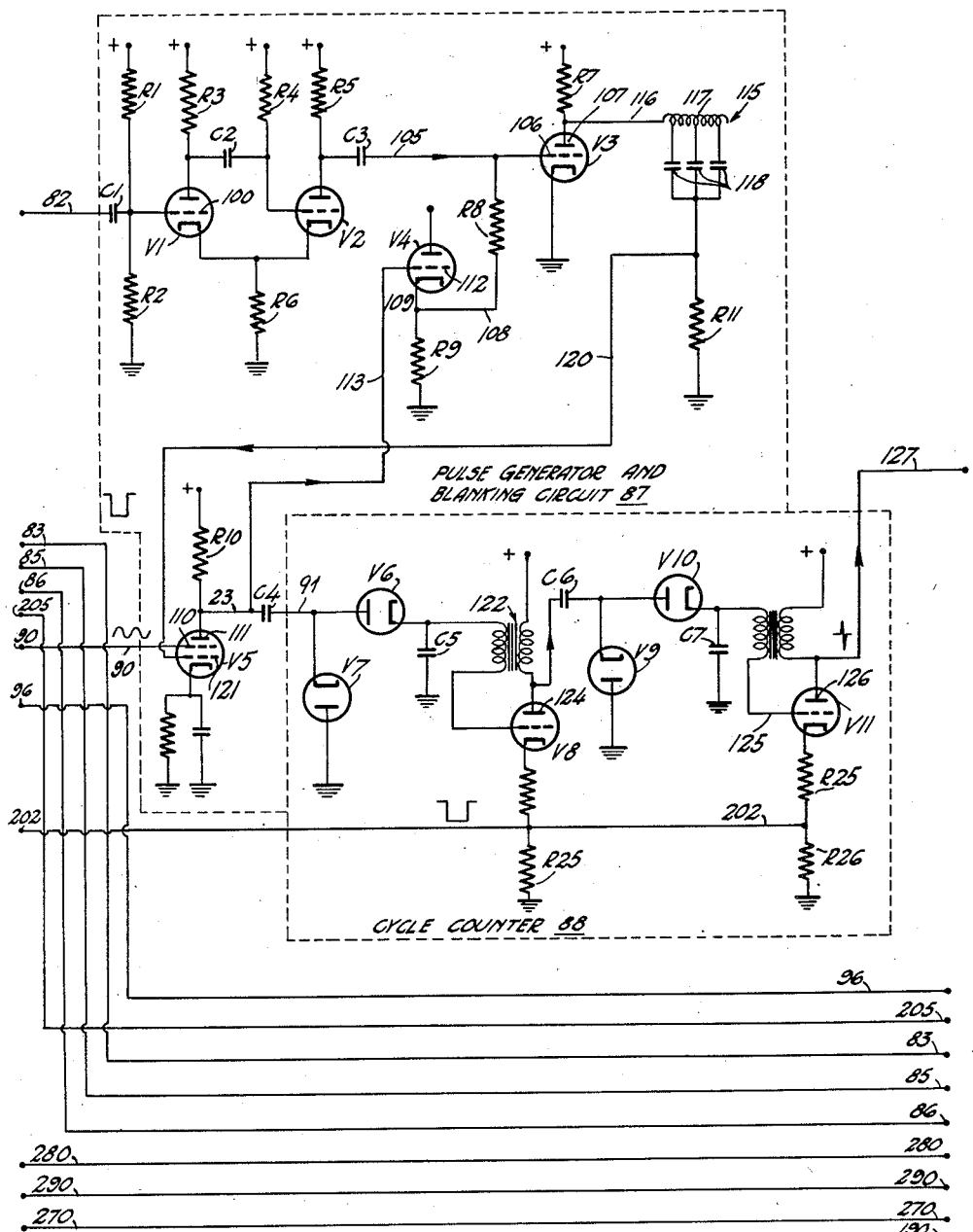
Figure 2C:
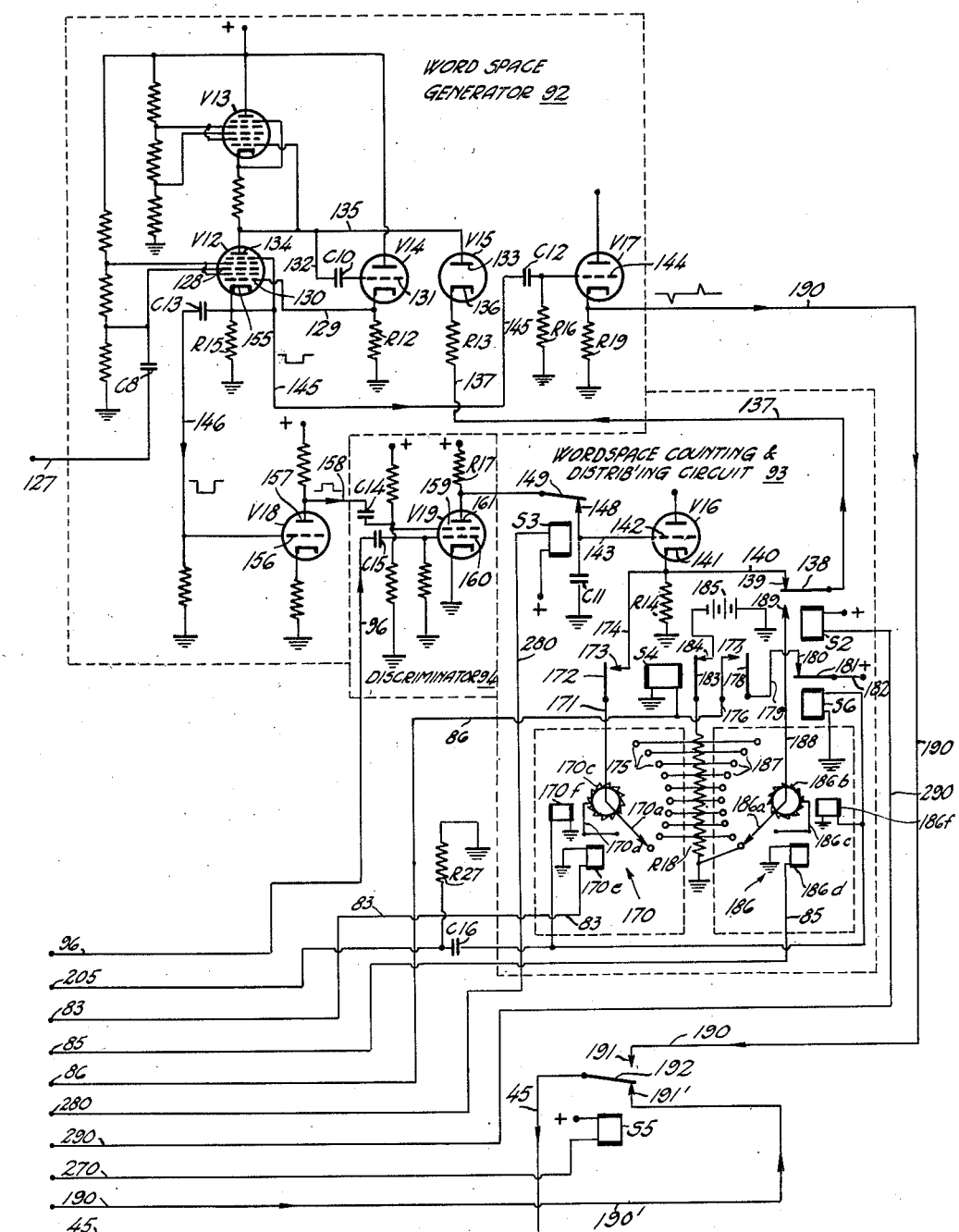

The guide pulse generating circuit 46 also includes a word-space generator 92, a word space counting and distributing circuit 93, and a discriminator circuit 94. The word space generating circuit 92 receives t. c. s. pulses from the cycle counting circuit 88 through a conduit 95. The conduit 95 may be found in Figure 1b. In Figures 2b and 2c this conduit is illustrated as including conductor 127. Antecedent word space signals are led from the engaged relay contacts 77 and 77a through the conduit 83 to the word space distributing and counting circuit 93. The discriminator 94 receives column width pulses through a circuit including the conduit 41 (from the timing disc 23) and a conduit 96, and the output of the discriminator is fed in turn to the word space distributing and counting circuit 93 through a conduit 97. A conduit 98 feeds the output of the word space distributing and counting circuit 93 to the word space generator 92. The conduit 98 as viewed in Figure 1b includes conductor 137 in Figure 2c. The entire circuit 46 is thus provided with means for receiving all of the information required to justify the line of type it is next to compose.

Instead of delaying the t. c. s. pulse an integral number of unit spaces to account for a word space, the t. c. s. pulse is delayed by a circuit whose delay may be adjusted to correspond to an irrational number of unit spaces. This allows exact justification of the composed line since word spaces do not have to conform to unit width values.

The operation of the system, in short, is based upon the use of time as a dimension in measuring the width of the column and in specifying the position in the composed line that each character is to take. The time duration of the column width pulses establishes the column width in terms of a time interval. The position within the composed line that a character is to take is given by the guiding pulse.

The guiding pulse is timed with respect to the column width pulse in accordance with the accumulated space occupied by preceding characters and word spaces. As a line of type is composed, the guiding pulse moves across or through the column width pulse indicating the position each character is to take. The angular position of the mirror accordingly is made to follow the progress of the guiding pulse through the use of the position pulse and galvanometer control circuit 19, the latter acting as a servo system.

Figure 5:
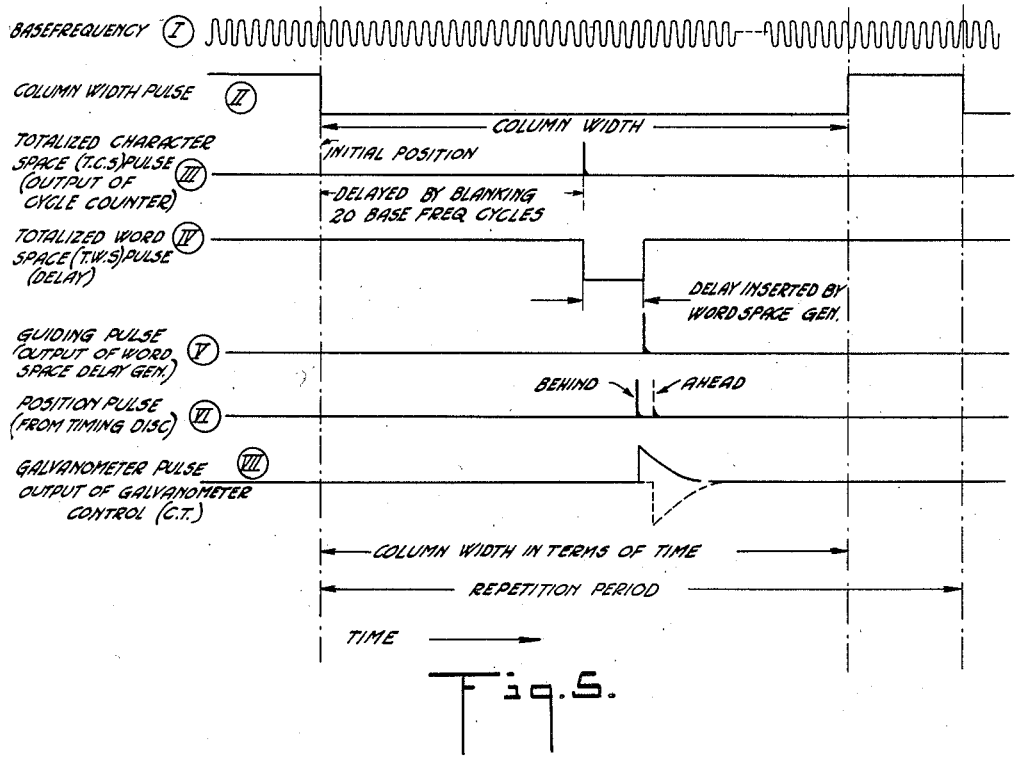
Fig. 5 is a diagram showing the time relationships in the operation of that portion of the system performing the character positioning function.

Fig. 5 shows the time relationships in the operation of the justifying and character positioning system. In this figure, line I shows the base frequency as generated from the timing disc 23 and line II the column width pulse also as generated from the timing disc. Line III shows the t. c. s. pulse as generated by the combination of the cycle blanking circuit 87 and cycle counter 88.

As stated, for the positions of the relay contacts 79 and 81 shown, the printing character space signals and the printing word space signals are delivered to the guide pulse generating circuit 46'. Printing character space information from the engaged relay contacts 79 and 79a is delivered through the conduit 84' to the blanking pulse generating circuit 87', and printing word space signals are delivered from the engaged relay contacts 81 and 81a to the word space distributing and counting circuit 93' through the conduit 85'.

As in the guide pulse generating circuit 46, the cycle counter 88' receives base frequency pulses from the timing disc 23 through the conduits 89 and 90'. Column width pulses are likewise delivered to the discriminator 94' through the conduits 41 and 96'. The guide pulse generating circuit 46' is thus provided with means for receiving all of the information necessary for positioning characters in the line being composed by projection thereof on to the film 11 by means of the mirror 15. (The circuit 46' has previously received antecedent and justifying signals relating to this line in the same manner that the circuit 46 is presently receiving antecedent signals for the following line.)

The cycle counter 88', which is described later in detail under the sub-heading "Blanking and cycle counting circuits," is of the step type which delivers a single short (time) duration pulse for every 200 cycles received. Therefore, the t. c. s. pulses delivered by the cycle counting or frequency divider circuit 88' have a frequency or repetition rate exactly equal to that of the column sweep or 5000 per second. By means of a counting synchronizer circuit 99 (Figs. 1b and 2c), these pulses initially are made to coincide with the beginning of the column width pulse as shown in lines II and III of Fig. 5. This coincidence occurs at the beginning of the composition of each line.

As each printing character space signal is received from the control tape 10 by the blanking circuit 87' through a circuit including the photo-electric cell 58, the amplifier 65, the conductor 78, the engaged contacts 79 and 79a of the relay S1 and the conductor 84', a number of cycles of the base frequency are blanked out and hence are not counted by the cycle counter 88'. For example, assuming that each printing character space signal blanks one cycle of the base frequency going to the cycle counter 88', then if 20 printing character space signals have been received, the t. c. s. pulses from the cycle counter would be lagging their initial timing by the time occupied by 20 base frequency cycles, as shown in line III of Fig. 5, and would occupy a position in the column width pulse corresponding to 20 units of width.

The t. c. s. pulses from the cycle counter 88' are delivered through a conduit 95' to the word space generator 92'. As indicated, the latter has previously been set up by the antecedent signals to delay each t. c. s. pulse it receives by an amount of time which is equivalent to the accumulated word space to be inserted. The t. c. s. pulses, therefore, are delayed by an amount of time representing the required word space as shown in lines IV and V of Fig. 5.

The pulse shown in line V of Fig. 5 is the guiding pulse. This pulse is now positioned within the column width pulse corresponding to the position the next character to be printed is to take.

If the position pulse as shown by the full lines in line VI of Fig. 5 occurs before the guiding pulse in time, the position of the mirror 15 will be lagging the required position along the column width. Such a time discrepancy between the two pulses will cause energy to be delivered to the galvanometer to rotate the mirror and move the character position ahead as previously described.

To establish the correct word space to justify the line next to be composed, the antecedent character space signals from the control tape 10 are delivered to the blanking circuit 87 of the guide generating circuit 46, and the blanking of cycles of the base frequency occurs as in the blanking circuit 87'. Antecedent word space signals from the control tape are delivered to a word space distributing and counting circuit 93. From this circuit's operation on the column width and t. c. s. pulses, a control voltage for the word space delay generator 92 is established. This control voltage adjusts its delay to a value which is equivalent to the total word space in the line to be composed. A detailed explanation of the operation of these circuits will appear later.

When the circuit 46 is transferred to the printing function (performed by the circuit 46' in the diagrams) by the operation of the relays S1 and S5, the total word space delay is divided into the individual word spaces by the word space counting and distributing circuit 93, and the guiding pulses are consequently delayed according to the accumulated word space to be inserted.

Figure 6:
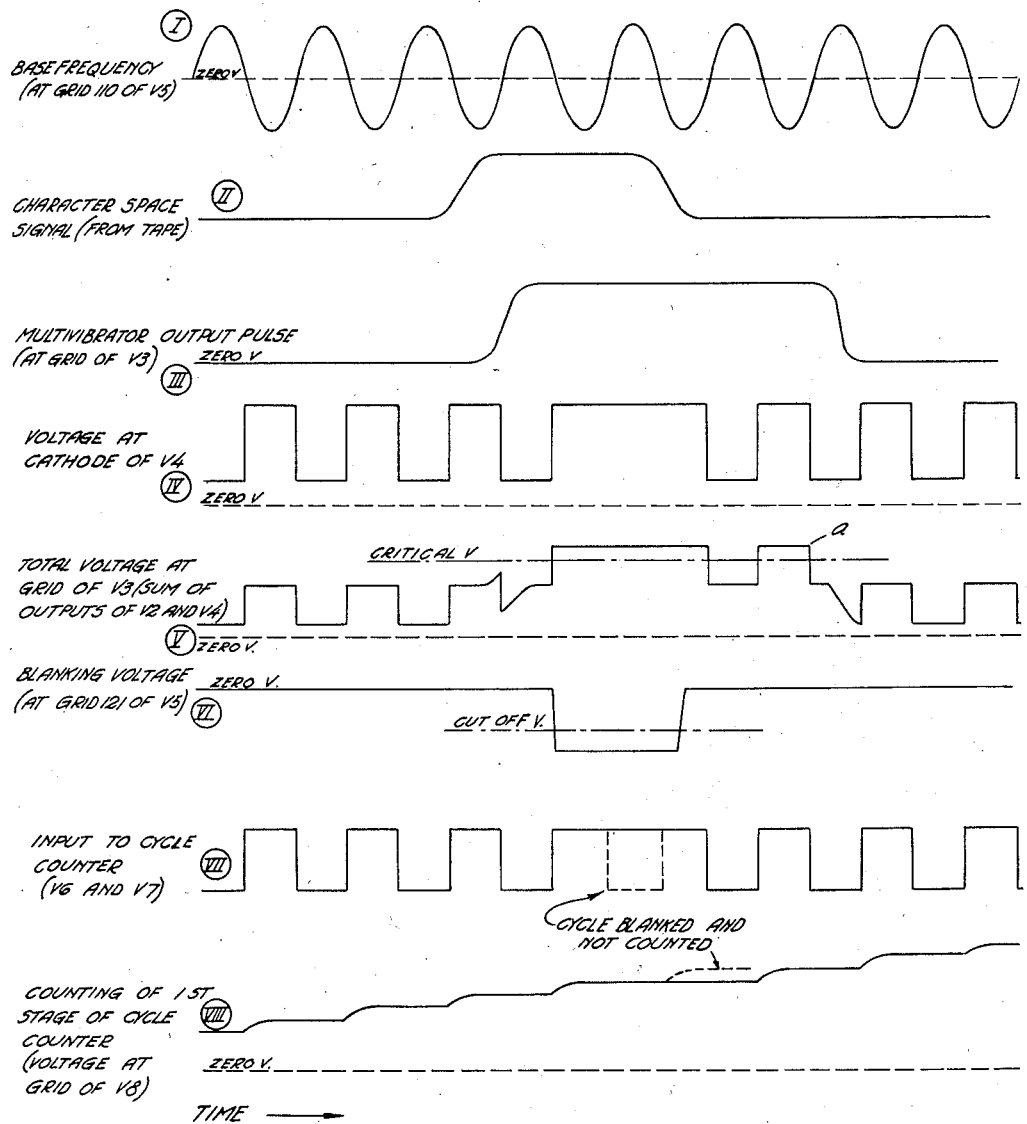
Fig. 6 is a diagram showing the time relationships in the operation of the blanking circuits.

IVa. Blanking and cycle counting circuits (Figs. 2b or 3a and 6)

Referring now to Fig. 2b, antecedent character space signals from the control tape 10 are led to a conventional cathode-coupled one-shot multivibrator circuit comprising the vacuum triodes V1 and V2, the resistors R1, R2, R3, R4, R5 and R6, and the condensers C1, C2 and C3 connected as shown in the figure.

The antecedent character space signals are applied by means of a conductor 82 to the grid 100 of the tube V1 through the condenser C1. The pulses generated by this multivibrator circuit are of a predetermined length, and appear at the plate of the tube V2 to be coupled by means of a conductor 105 and the condenser C3 to the grid 106 of a gas triode V3.

The gas triode V3 has a plate 107 connected to a suitable source of positive potential through a resistor R7 and is normally nonconducting. To ionize or render the tube V3 conducting requires the simultaneous application to the grid 106 of positive voltages from the multivibrator circuit through the conductor 105 as well as positive voltages through conductor 108 and a resistor R8 from the cathode 109 of a vacuum triode V4 which is connected as a cathode follower. The grid 112 of the tube V4 is connected by a conductor 113 to the plate 111 of a tetrode V5, one grid 110 of which receives the base frequency from the timing disc 23 through the conductor 90. The tube V5 functions as a clipping amplifier to produce square waves of the base frequency at its plate 111 which is connected to a source of positive potential through a resistor R10.

The grid bias on the gas tube V3 is so arranged that positive pulses from the multivibrator and from the tube V5 must appear simultaneously to initiate conduction in the tube V3, as stated. A network 115 is connected to the plate 107 of the tube V3 by a conductor 116, and also to a source of positive plate potential through the resistor R7. The network 115 may comprise, for example, a series inductance 117 and a plurality of shunt condensers 118, the latter being adapted to be charged through the resistor R7. When the tube V3 is rendered conducting, the network 115 discharges through a resistor R11, causing a pulse of voltage of comparatively constant amplitude to be developed across the latter. This voltage is fed by a conductor 120 to a second grid 121 of the tube V5, which pulse biases this tube beyond cut-off, thereby preventing its operation during the interval when the network 115 is discharging.

The time relationships involved in the operation of the previously described blanking and pulse generating circuits 87 are shown schematically in Fig. 6. Line I in that figure shows the base frequency from the disc 23 (Fig. 4) which is applied to the grid 110 of the tube V5. Line II shows a character space signal as it is received from the conductor 82 and fed to the blanking circuit 87. The timing of the character space signal with respect to the base frequency may be random. Line III shows the multivibrator output pulse which is applied to the grid 106 of the gas triode V3. This output pulse may also be randomly timed with respect to the base frequency. Line IV shows the square wave output appearing across the resistor R9 and which is also applied to the grid 106 of the gas triode V3. Line V shows the total voltage applied to the grid 106, which is the sum of the two voltages shown in lines III and IV.

As indicated in line VI, the total voltage when a pulse is generated by the multivibrator exceeds the critical voltage of the tube V3 so that the latter becomes conducting and discharges the network V5. This results in the application of a blanking pulse (line VI of Fig. 6) to the grid 121 of the tube V5, momentarily biasing the latter beyond cut-off. As a result, one pulse in the output at the plate 111 of the tube V5 is blanked out, as shown in line VII of Fig. 6, and is, therefore, not counted by the counter receiving the output of the tube V5.

It should be noted that the blanking voltage begins simultaneously with the rise in the first square wave of line IV which follows initiation of the multivibrator output pulse (line III) and is between one and one and one-half cycles in time duration. This is to insure the blanking of one complete cycle. When the network 115 is completely discharged, it will not produce another blanking pulse until it has had time to recharge through the resistor R7. The blanking voltage is not reapplied, therefore, the second time the total voltage at the grid of the gas triode V3 exceeds the critical voltage as shown at the point *a* in line V.

Different point sizes of type for the characters may be accommodated by changing the time duration of the pulse developed by the discharging network 115 so as to blank integral numbers of cycles in proportion to the type sizes desired. Networks with different pulse duration times may be switched in or out of the circuit by suitable relays, for example, to effect this result.

In the form of the invention shown in Fig. 2b, a two stage, step type counter is used. The first counter stage comprises the vacuum diodes V6 and V7, and the condensers C4 and C5, the voltage developed across the condenser C5 being fed to a conventional blocking oscillator circuit 122 including the vacuum triode V8. The input to the first counter stage is the square wave output from the tube V5, the plate 111 of the latter being connected to the condenser C4 by a conductor 123. The pulses appearing at the plate 124 of the tube V8 are fed to a second counter stage comprising the vacuum diodes V9 and V10 and the condensers C6 and C7. The voltage developed across the condenser C7 is fed to a conventional blocking oscillator circuit 125 including a vacuum triode V11 which delivers a pulse at its plate 126. The operation and construction of step counters of this type are well known and a detailed description thereof need not be given herein. Suffice it to say that a single pulse called a t. c. s. (totalized character space) pulse, is developed at the plate 126 of the tube V11 for each 200 pulses fed to the first stage of the counter from the tube V5.

Obviously, any other suitable cycle counter means, such as pulse counters of the binary type, may be used in lieu of the system just described. Such pulse counters are well known in the art and a complete description of scale of two counters may be found in vol. 19 of the Radiation Laboratory Series published by the McGraw-Hill Book Co., entitled "Waveforms" by Chance, Hughes MacNichol, Sayre and Williams at chap. 17, pages 604 to 612. Binary counters are also disclosed and described in the "Handbook of Industrial Electronic Circuits" by Marcus and Zelef.

Figure 3B:
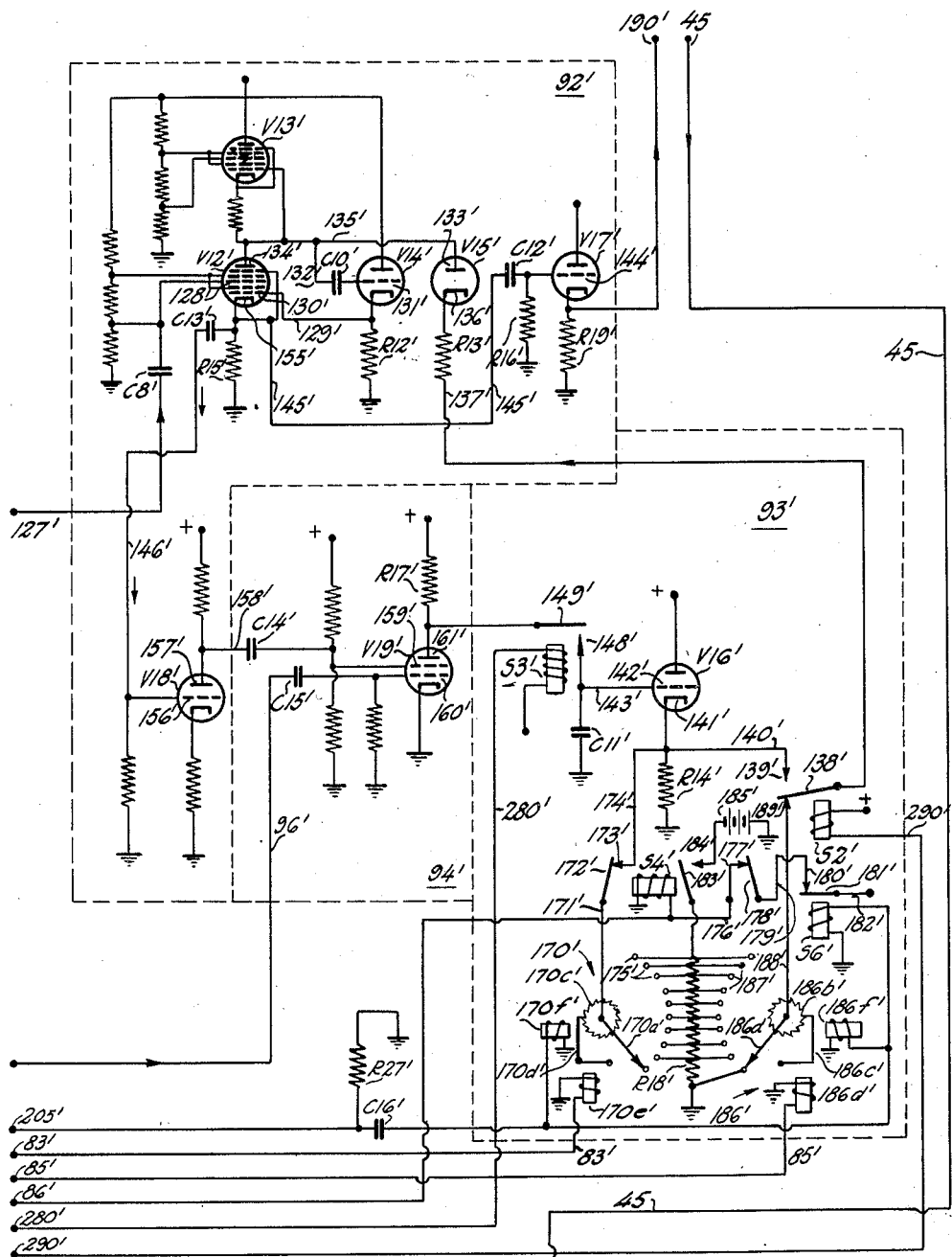
Figure 7:
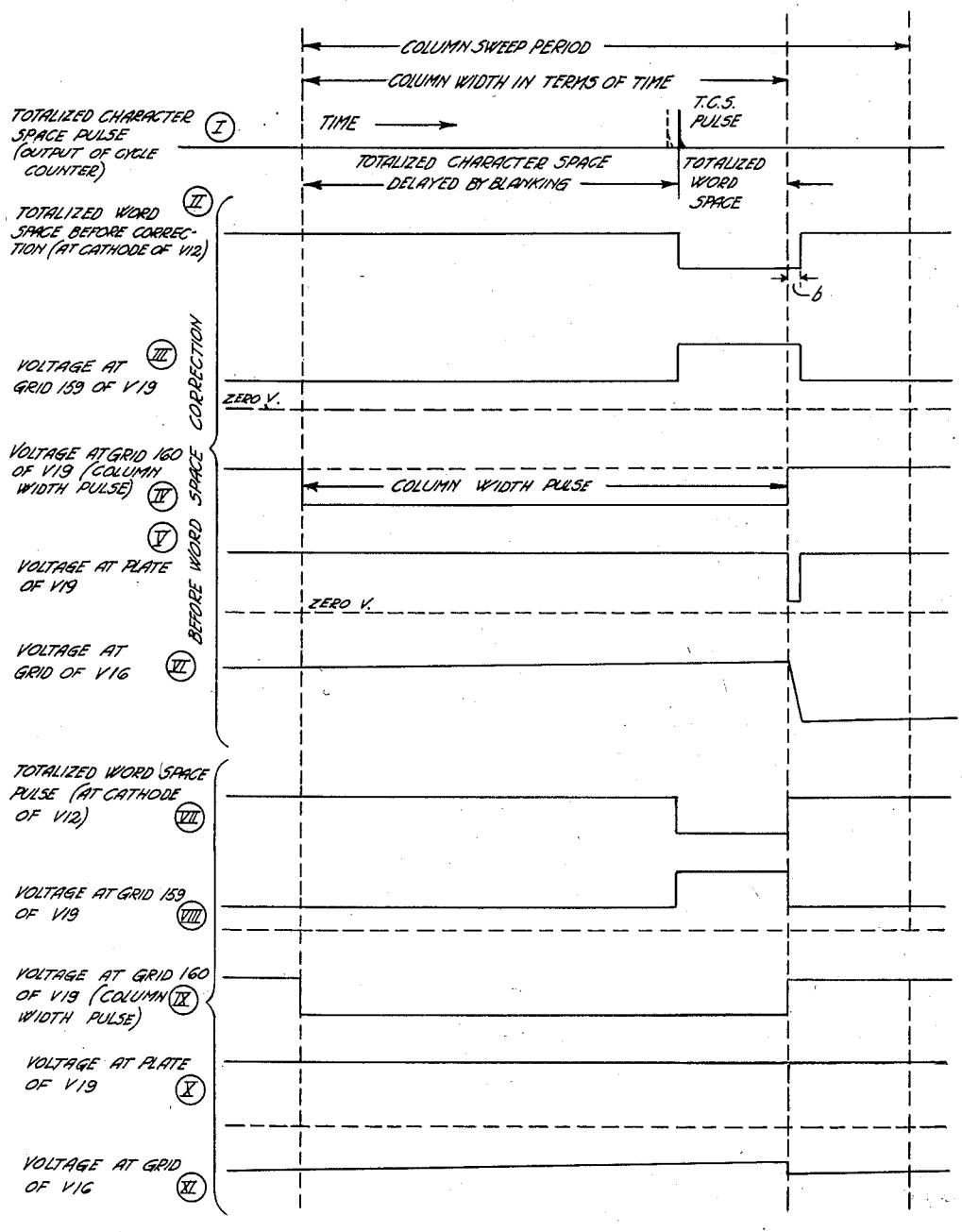
Fig. 7 is a diagram showing the time relationships in the operation of the system in performing its justifying cycle.

IVb. *Word space delay generator circuits*
(Figs. 2c or 3b and 7)

During the justifying cycle of the guide pulse generating circuit 46, the t.c.s. pulses from the plate 126 of the tube V11 in the cycle counter 88 are applied through a conductor 127 and a condenser C8 to a grid 128 of a pentagrid vacuum tube V12. The tube V12 is connected as a so-called "phantastron" time delay circuit, a description of which is given in "Electronics" magazine for April 1948, beginning at page 100. The circuit utilizes a pentagrid vacuum tube V13 as a dynamic load resistor to obtain a uniform rate of change in the mutual conductance of the tube down to zero plate voltage.

The operation of this phantastron circuit is such that a constant voltage output pulse is obtained, in response to and immediately following each t.c.s. input pulse, which output pulse is proportional in its duration to the magnitude of a control voltage, the source of which is the "Word space counting and distributing circuit" to be described. The variable duration output pulse of the phantastron is then differentiated to obtain a guide pulse for controlling the position of the mirror 15, as described.

The tube V14 is a cathode follower having a load resistance R12 connected by a conductor 129 to a grid 130 of the tube V12, its grid 131 receiving the output of the latter tube through a condenser C10 in series with a conductor 132. The vacuum tube V15 is a plate voltage limiting diode, the anode 133 of which is connected to the plate 134 of the tube V12 by a conductor 135, and the cathode 136 of which is connected through a resistor R13, a conductor 137, a movable switch contact 138 on a relay S2, engaging a fixed contact 139, and a conductor 140 to the cathode 141 of a tube V16. The tube V16 is a cathode follower, the cathode 141 of which is connected to ground through a resistor R14 and the grid 142 of which receives a control voltage developed across a condenser C11 through a conductor 143. The condenser C11 is connected to a fixed contact 148 on a relay S3 which is engaged by a movable contact 149 connected to the plate 161 of the tube V19. These connections enable the condenser C11 to be charged through the plate resistor R17.

The tube V17 is a cathode follower having its grid 144 connected through a condenser C12 and a conductor 145 to the cathode 155 of the tube V12, which is connected to ground through a resistor R15. The condenser C12 cooperates with a grid leak resistor R16 for the tube V17 to form a differentiating circuit to produce a positive guiding pulse at the end of the delay time of the circuit (i. e. at the end of the variable duration pulse at the cathode 155 of the tube V12).

It will be recalled that, during the justifying cycle, the next line of copy to be printed is being scanned by the antecedent scanning mechanism comprising the photoelectric cells 56 and 57 (Fig. 1a). Prior to the receipt of the first character space signal, the t.c.s. pulses appearing at the rate of 5000 per second at the plate 126 of the tube V11 (Fig. 2b) coincide with the beginnings of corresponding column width pulses, which have the same repetition rate. As each successive character space signal is received, the counter 88 skips one cycle so that t.c.s. pulses are delayed with respect to the beginnings of the column width pulses by an amount proportional to the number of character space signals received.

When all of the character space signals for the line being scanned have been received, the delay between the beginnings of the column width pulses and the t.c.s. pulses is proportional to the total number of characters in the line. The delay between the t.c.s. pulses and the ends of the column width pulses represents the total space in the line that is to be taken up by spaces between words. According to the invention, the total word space determined in this fashion is represented by a voltage which is utilized during the printing cycle to insure the insertion of the proper space between lines to produce correctly justified lines of printed matter.

In the operation of the word space generator 92 each t.c.s. pulse received from the plate 126 of the tube V11 in the counter 88 results in the appearance of a negative pulse at the cathode of the tube V12, the beginning of which pulse coincides with the reception of the t.c.s. pulse at the grid 128 of the tube V12. The time duration of this pulse is variable and is controlled in a manner to be described below. This negative pulse is applied to the grid 156 of a triode V18 through a condenser C13 and a conductor 146 and it produces a positive pulse at the plate 157 of the tube V18. This positive pulse is coupled by means of a conductor 158 and a condenser C14 to a grid 159 of the vacuum tube V19.

Coupled to a second grid 160 of the tube V19 through the conductor 96 and a condenser C15 are the column width pulses as generated by the timing disk 23. The tube V19 functions as a discriminator although its action is somewhat related to a gating device. Its purpose is to maintain the charge on the condenser C11 at such a value that the time delay of the delay or word space generator circuit 92 is equal to the interval between the t.c.s. pulse and the ending of the column width pulse. The operation of this element will be explained in greater detail below under the heading Word Space Counting and Distributing Circuits. The delay of the circuit or total word space delay will hereafter be termed the "t.w.s." delay. It is equal to the time remaining of the column width pulse after subtracting the totalized character space in terms of time.

The time relationships between the several signals involved in the operation of the word space delay generator and its associated circuits are shown in Fig. 7. The t. c. s. (totalized character space) pulse as delivered to the delay generator 92 by the cycle counter 88, is shown in line I, time being measured from the beginning of the column width pulse. The delay between the beginning of the column width pulse and the t. c. s. pulse is proportional to the number of character spaces in the line for which signals have been received up to that time. In dotted lines is shown the previous position of the t. c. s. (totalized character space) pulse before the last character space signal was received. Assuming that the circuit was stabilized at the time just previous to the receipt of the last character space signal, the time duration of the negative pulses appearing at the cathode 155 of the tube V12 will be equal to the time delay between the dotted line t. c. s. pulse in line I and the end of the column width pulse. When the full line t. c. s. pulse is received, the beginning of the negative pulse at the cathode 155 of the tube V12 will be delayed to coincide with the t. c. s. pulse. However, the time duration of the negative pulse initially is the same as before so that its end lags the end of the column width pulse by an amount "b" as shown in line II.

The negative pulse of line II, after passing through the tube V18, appears as a positive pulse at the grid 159 of the tube V19, the beginning and ending of the positive pulse coinciding with the beginning and ending, respectively, of the negative pulse of line II, as shown in line III. Meanwhile, the column width pulse (line IV) is being applied to the grid 160 of the tube V19. The tube V19 is so arranged that it conducts only during that portion of the positive pulse of line III which occurs after the end of the negative column width pulse applied to the grid 160. When the tube V19 conducts, the voltage at its plate 161 drops as shown in line V.

While the tube V19 is conducting, it discharges the condenser C11 thus reducing the condenser voltage, as shown in line VI of Fig. 7, by an amount depending upon the duration of the pulse shown in line V. The reduction in the voltage across condenser C11 produces a corresponding reduction in the voltage appearing across the cathode resistor R14 of the cathode follower V16. This reduced voltage, which is fed through the conductor 140, fixed relay contact 139 engaging movable relay contact 138, the conductor 137, the resistor R13, the diode limiter V15 and the conductor 135 to the plate 134 of the tube V12, reduces the time duration of the pulses produced at the cathode 155 of the tube V12. The reduction in pulse width is sufficient to bring the end of the t. w. s. pulse substantially into coincidence with the end of the column width pulse, as shown in line VII of Fig. 7.

As indicated in lines X and XI of Fig. 7, the t. w. s. pulse overlaps the end of the column width by just enough to discharge the condenser C11 by an amount equal to the amount it has increased in charge during one repetition period. But the t. w. s. pulse delay is maintained at a stable value until the t. c. s. pulse assumes a new position upon receipt of the next character space signal. It will be understood that the action shown in lines I–VI, inclusive, of Fig. 7 may take several periods to accomplish rather than a single period as shown for purposes of illustration.

When all of the character space signals have been received, the t. w. s. control voltage appearing at the cathode 141 of the tube V16 is stabilized at the final value representing the total word space for the line. The t. w. s. control voltage is maintained at that value during the subsequent composing cycle by the charge on the condenser C11. After the justifying cycle has been completed, the relay S3 is energized to disconnect the condenser C11 from all circuits except the grid circuit of the tube V16 during the composing cycle, so that the charge thereon will remain constant. The relay S3 is triggered at the end of each line by the action of a resetting circuit to be described later. Thus, the contacts 148 and 149 of the relay S3 will be closed, for example, on the first, third, fifth . . . etc., cycles or lines and opened on the second, fourth, sixth . . . etc., cycles, the former being during justification and the latter during printing.

IVc. *Word space counting and distributing circuits*

(Figs. 2c and 3b)

During the justifying cycle, the word space counting and distributing circuit 93 divides the control voltage appearing across the cathode resistor R14 by the number of word spaces in the line, thus determining the control voltage increment corresponding to one word space. During the printing cycle, the word space counting and distributing circuit 93 transmits to the word space generator 92 a control voltage equal to the product of the control voltage increment and the number of word space signals received up to the instant of transmission.

Division of the control voltage by the number of word spaces may be accomplished by a stepping switch 170 having a movable contact 170a which is adapted to engage selectively a plurality of fixed equal taps 175 on a resistor R18, one end of which is connected to ground as shown. The movable contact 170a has formed thereon a ratchet 170c which is adapted to be advanced in steps by a pawl 170d actuated by an electromagnet 170e energized by antecedent word space signals transmitted over the conductor 83.

The movable contact 170a is connected through a conductor 171 to a movable contact 172 of the relay S4. Since a justifying signal will be transmitted over the conductor 86 a few characters before the end of the antecedent scanning of a line, if justification is necessary, the relay S4 will have been previously energized and its movable contact 172 will be in engagement with a fixed contact 173 which is connected by a conductor 174 to the cathode 141 of the tube V16. Once energized, the relay S4 is maintained in that state by a holding circuit including a conductor 176, fixed relay contact 177 engaging movable contact 178, a conductor 179, fixed contact 180 engaging movable contact 181 of a relay S6, and a conductor 182 connected to the positive terminal of a source of voltage (not shown).

When the relay S4 is energized, therefore, a portion of the resistor R18 is connected in parallel with the resistor R14, said portion including as many equal resistance increments of the resistor R18 as antecedent word space signals that have been transmitted over the conductor 83. When the movable contact 170a is in its final position, after the last word space signal has been received, the voltage between any two adjacent live taps 175 on the resistor R18 will be proportional to the control voltage appearing across the resistor R14, divided by the number of word spaces in the line.

If the line being scanned during the justifying cycle does not require justification, as where a short line ends a paragraph, no justifying signal is transmitted over the conductor 86 and the relay S4 is not energized. In such case, the movable contact 170a of the stepping switch 170 is not connected to the cathode 141 of the tube V16. Instead, the upper end of the resistor R18 is connected through movable relay contact 183 engaging fixed contact 184 on relay S4 to one terminal of a source of fixed voltage 185, the other terminal of which is grounded. The magnitude of the voltage developed by the source 185 is such as to establish between adjacent taps on the resistor R18 a voltage increment proportional to a standard word spacing.

During the composing or printing cycle, word space voltage increments are picked off the resistor R18 by a second stepping switch 186 having a movable contact arm 186a adapted to engage selectively a plurality of taps 187 on the resistor R18, which correspond exactly to the taps 175. The movable contact arm 186a is provided with a ratchet 186b which is adapted to be advanced in steps by a pawl 186c actuated by an electromagnet 186d energized by printing word space signals transmitted over the conductor 85. The movable contact arm 186a is connected by a conductor 188 to a fixed contact 189 on the relay S2.

Upon completion of the justifying cycle the relay S2 is energized by a signal transmitted through a conductor 290. This causes the movable relay contact 138 to disengage the fixed contact 139 and to engage the contact 189. Hence, during the printing or composing cycle, the movable contact arm 186a of the stepping switch 186 is connected through the conductor 137 to the lower end of the resistor R13. As successive printing word space signals are received over the conductor 85, the movable contact arm 186a is moved along the taps 187 on the resistor R18, thereby increasing the control voltage applied to the word space generator 92 in corresponding steps. As a result, the time duration of the negative pulses produced at the cathode 155 of the tube V12 increases correspondingly. These pulses are fed through the conductor 145 and through the differentiating circuit comprising the condenser C12 and the resistor R16 to the grid 144 of the tube V17.

The guiding pulses appearing across the resistor R19 are transmitted through a conductor 190 to the fixed contact 191 of a relay S5. The relay S5 also has a movable contact 192 which is adapted to engage selectively either the fixed contact 191 or a second fixed contact 191′, depending on which of the guide pulse generating circuits 46 or 46′ is to perform the printing or composing function. The movable contact 192 is connected by the conductor 45 to the galvanometer control circuit 19, which will be described in detail below.

It will be understood, therefore, that when the guide pulse generating circuit 46 is performing the printing function, each guiding pulse at the conductor 190 lags the beginning of the column width pulse by an increment of time proportional to the total number of printing character signals received up to that time, plus a time delay proportional to the total word space required to be inserted up to that time for proper justification of the line.

V. *Function transferring and resetting circuits*

(Fig. 2a)

The transfer of the guide generating circuit 46 from the justifying cycle to the composing or printing cycle is effected by the line signals derived from the control tape (Fig. 1a) and transmitted through a circuit including the conductor 68 to a conventional flip-flop circuit comprising the gas triodes V21 and V22, the condensers C17 and C18 and the resistors R20 and R21 (Fig. 2a). Each time a line signal is transmitted through the conductor 68 at the beginning of each new line, conduction is transferred from one of the tubes V21 and V22 to the other. In Fig. 2a, the gas tube V22 is in a conducting state while V21 is in a non-conducting state.

The change of this flip-flop circuit operates the relay S1 through a conductor 194, the relay S2 through a conductor 290, a relay S3 through a conductor 280 and the relay S5 through a conductor 270, to interchange the inputs and outputs of the two guide pulse generating circuits and thus to interchange their justifying and printing functions.

The line signals also cause the resetting of the cycle counters 88 and 88′ and their synchronizing circuit 99 (Fig. 4), this being accomplished by the reset circuit 69 (Fig. 2). The reset circuit 69 comprises a gas triode V20, the grid 196 of which is connected through the condenser C19 and a conductor 197 to the conductor 68, a gridleak R22 being connected between the grid 196 and ground. The plate 198 of the tube V20 is connected through a resistor R23 to a plate voltage supply (not shown), and also to a network 199 comprising a series inductance 200 and the shunt condensers 201. The network is connected through a resistor R24 to ground.

The ignition of the tube V20 as effected by the line signals from the conductor 68 discharges the network 199. This establishes a negative voltage across the resistor R24 which is applied through a conductor 202 to the resistors R25 and R26 (Fig. 2b) in the cathode circuit of the blocking oscillator tube V8 and in the cathode circuit of the second blocking oscillator tube V11, respectively. With each resetting pulse the respective cycle counters 88 and 88′ are, thus, reset to their initial or starting positions.

The relay S1 is also provided with a movable contact 203 connected by a conductor 204 to the positive terminal of a source of voltage (not shown) and adapted to engage either of two fixed contacts 203a and 203b (Fig. 2a). The fixed contact 203a is connected through a conductor 205 and a condenser C16 to the resetting electromagnets 170f and 186f for the stepping switches 170 and 186, respectively (Fig. 2c). A resistor R27 is connected between the conductor 205 and ground to provide a discharge path for the condenser C16. The fixed contact 203b is connected to similar elements in the guide pulse generating circuit 46′ (Fig. 3b), like elements in the latter being designated by like primed reference characters.

The reset voltage from the conductor 204 (Fig. 2a) is applied to the electromagnets 170f, 186f (Fig. 2c) and 170f', 186f' (Fig. 3c) on alternate line signals to reset the selector or stepping switches 170, 186 and 170', 186'. In the guide pulse generating circuit 46, the resetting is accomplished by the charging current to the condenser C16 (Fig. 2c) which energizes the electromagnets 170f and 186f when the movable switch contact 203 (Fig. 2a) moves out of engagement with the fixed contact 203b and engages the fixed contact 203a. When the movable switch contact is subsequently switched out of engagement with the fixed contact 203a and into engagement with the fixed contact 203b, the condenser C16 discharges through the resistor R27. It will be noted that the amplitude of flow of the condenser discharge current through the electromagnet 170f is less than that required to reset the stepping switch 170 to zero because of the resistance R27. The relay S6 is also energized by the reset voltage from the conductor 204.

It will be understood, therefore, that when the guide generating circuits are transferred from the justifying to the composing function, the position of the electromagnet 170f (or 170f') remains as set up during the justifying cycle. Thus, the reset voltage does not destroy the information set up in the stepping switch 170 as shown when the guide pulse generating circuit 46 reverts from the justifying cycle to the printing cycle.

VI. Galvanometer control circuits (Fig. 4)

Fig. 4 shows in detail the galvanometer control circuit 19 and the connections between this circuit and the galvanometer mechanism 18.

The circuit consists of the gas triodes V27, V28, V29, and V30. The grid 206 of the tube V28 is connected by the conductor 45 through a condenser C20 to receive the positive guiding pulses from the guide pulse generating circuit, 46 or 46', which is performing the printing function. The grid 207 of the tube V27, meanwhile, receives reset pulses through the conductor 44 and the condenser C21 from the amplifier and differentiating circuit 43. The column width pulses are fed to the circuit 43 from the conductors 41 and 42 and the reset pulses occur simultaneously with the beginnings of the column width pulses as generated by the amplifier 40 of Fig. 4.

At the beginning of each column sweep period, the reset pulses generated by the circuit 43 cause the tube V27, a gas triode, to become conducting. The arrival of a guiding pulse through the conductor 45 during the column sweep period causes the tube V28 to become conducting and the tube V27 to become extinguished since the tubes V27 and V28 are connected in a conventional gas triode flip-flop circuit.

The position pulses from the amplifier 27 are applied simultaneously to the grids 208 and 209 of the gas triodes V29 and V30 through the conductor 28, the conductors 28a and 28b, and the condensers C22 and C23, respectively. When the tube V27 is conducting, the voltage across its cathode resistor R28 is connected to the grid biasing circuit of the tube V29 through a conductor 210. This brings the grid voltage on the tube V29 almost to its conduction value so that if a positive pulse is applied to its grid 208, conduction will be started. The same connection exists between the tubes V28 and V30 through a conductor 211, so that the tube V28, when conducting, supplies a gating grid voltage to the tube V30.

If the position pulses arrive at the grids 208 and 209 of the tubes V29 and V30 before the guiding pulses have switched conduction from the tube V27 to the tube V28, the position pulses will cause the tube V29 to conduct. If, however, the position pulses arrive later than the guiding pulses, the tube V30 will be made to conduct by the position pulse.

When the tube V29 conducts, it discharges a condenser C24 (which is grounded at one end and has its other end connected to the plates of the tubes V29 and V30 by a conductor 212). The discharge takes place through the plate cathode circuit of the tube V29 and through a resistor R29. The voltage thus developed is impressed upon the galvanometer coil 16, the latter being connected to the cathode 213 and 214 of the tubes V29 and V30, respectively by the conductors 216. When the tube V30 conducts, the condenser C24 is discharged to ground through a resistor R30 in the plate-cathode circuit of the tube V30 and the voltage developed across the resistor R30 is impressed upon the galvanometer coil 16 through the conductors 216. The direction of current through the galvanometer coil 16 is thus controlled by the tubes V29 or V30 and the mirror 15 will be rotated in one direction or the other depending upon which of these tubes is conducting.

When the position pulses and the guiding pulses occur simultaneously, the tubes V27 and V28 will be in the act of exchanging conduction and both will be in states of conduction. Under these conditions, both the tubes V29 and V30 will be caused to conduct by the position pulse and the net current through the galvanometer coil will be substantially zero, therefore, causing no rotation of the mirror 15.

Simultaneous arrival of the position pulse and the guiding pulse results when the mirror 15 is in its correct position, and no change is required. When the guiding pulse precedes its position pulse, the mirror is lagging and the required position and current is delivered to the galvanometer coil 16 to bring the mirror to the proper position. When the position pulses precede the guiding pulses, the mirror is ahead of the required position and the current is delivered to the galvanometer coil to bring it back to the correct position.

While the discharge current delivered to the galvanometer coil 16 will be in the form of pulses, it will be understood that the inertia of the galvanometer mechanism 18 and the mirror 15 will cause the movement thereof to be proportional to the root mean square value of the current.

VII. Synchronizing circuits (Fig. 4)

The counting synchronizer 99 shown in detail in Fig. 4 is operable at the beginning of each new line of composition both in the justifying cycle and in the composing cycle to insure that both of the cycle counters 88 and 88' begin counting simultaneously and in synchronism with the beginning of the column sweep period.

The counting synchronizer circuit 99 consists of two vacuum triodes V25 and V26 connected in a conventional flip-flop circuit as shown. Connected to the cathode 217 of the tube V26 is a resistor R31 from which a gate voltage for the base frequency amplifier 36 is received through a conductor 218. The gate pulse is such that when the tube V25 is conducting and a voltage appears across the resistor R31, the amplifier 36 is operative. When no voltage appears across the resistor R31, no output is transmitted from the amplifier 36 through the conductor 90 to the tubes V5 and V5' in the two blanking circuits 87 (Fig. 2b) and 87' (Fig. 3a), respectively.

When a line signal is received from the tape 10 and a reset pulse is transmitted from the reset circuit comprising the tube V20 (Fig. 2a) to the pulse frequency dividers 88 and 88', the same pulse is also delivered through the conductor 219 to the grid 251 of the tube V25 of the counting synchronizer 99. This is called the locking pulse and it causes the tube V25 to conduct and the tube V26 to be cut off. The output of the amplifier 36 is then cut off and no base frequency signals are delivered to the tubes V5 and V5' of the respective blanking circuits 87 or 87'.

At the beginning of the first column sweep period succeeding the reset pulse or the locking pulse, the pulse generated by the amplifier 43 and derived from the leading edge of the column width pulse is delivered to the grid 220 of the tube V26 through the conductor 221 and the condenser C25. This causes the tube V26 to conduct and the tube V25 to become non-conducting. Restoration of the tube V26 to the conducting state causes the amplifier 36 to become operative. The latter then delivers the base frequency signals to the tubes V5 and V5' of the blanking circuits 87 and 87' and in turn, to the corresponding counting circuits 88 and 88'. In this manner, cycle counting begins simultaneously with the beginning of a column sweep period, and the initial position of the t.c.s. pulse coincides with the beginning of the column width pulse.

OPERATION

As stated, while one of the guide pulse generating circuits 46 and 46' is performing the justifying function, the other is performing the printing or composing function. Further, as each printing function is completed, the functions of the two circuits are interchanged so that the circuit previously performing the justifying function begins a printing operation, while the circuit which previously was printing, assumes the justifying function for the next succeeding line of printed matter.

With the circuits adjusted as shown in the diagrams, the guide generating circuit 46 is set up to perform the justifying data determining function, while the corresponding circuit 46' is set up to compose or print a line.

Considering first the justifying data determining function performed by the circuit 46, the cycle counter 88 counts cycles of the base frequency transmitted to the tube V5 over the conductor 90, certain of those cycles being blanked by character space signals transmitted to the blanking circuit 87 over the conductor 82 (Fig. 2b).

As a result of the blanking operation, the t.c.s. pulses delivered at the plate 126 of the cycle counter tube V11 lag behind the beginnings of the column width pulses by an amount proportional to the number of character space signals that have been received.

The t.c.s. pulses delivered at the conductor 127 are utilized in the word space generator 92, the disscriminator 94 and the word space counting and distributing circuit 93 to produce a voltage across the resistor R14 of the tube V16 which is proportional to the amount by which the guiding pulses at the conductor 190 should be delayed to effect proper justification of the printed line.

When all of the character space signals in a line being scanned have been received, the voltage developed across the cathode resistor R14 will be exactly proportional to the time lag between the t.c.s. pulses and the ends of the column width pulses, i. e. will be proportional to the total word space in a line. This voltage is impressed upon a portion of the resistor R18 as determined by the number of steps advanced by the movable contact 170a of the stepping switch 170 in response to antecedent word space signals delivered to its actuating electromagnet 170e from the conductor 83. For example, if the total number of word spaces in the line that has been scanned is seven, the movable contact arm 170a will engage the seventh tap 175 from the bottom of the resistor R18 so that the voltage developed between any two adjacent taps thereon will be proportional to the space that should be inserted between words to effect proper justification. The circuit 46 is now ready to be switched to the printing function as soon as the circuit 46' has completed its printing function.

Considering now the printing or composing function performed by the guide pulse generating circuit 46' (Fig. 3), the latter is initially in the condition reached by the guide pulse generating circuit 46 at the end of its justifying operation described above. Thus, there is a voltage across the resistor R14' whch is proportional to the total word space in the line that is to be printed.

Further, the movable contact arm 170a' is in engagement with the tap 175' on the resistor R18' which corresponds to the number of words in the line to be printed. If there are seven words, for example, then the movable contact arm 170a' will be in engagement with the seventh tap 175' from the bottom of the resistor R18' so that the voltage between any two adjacent taps will be directly proportional to the word space that should be inserted between adjacent words for proper justification of the printed line.

As the printing word space signals are delivered to the electromagnet 186d' over the conductor 85', the movable contact arm 186a' of the stepping switch 186 is moved to successive taps 187' on the resistor R18. Thus, when the first printing word space signal is received, the movable contact arm 186a' is moved to the first tap 187', picking off the resistor R18' a voltage increment proportional to one word space. Since the movable contact 138' of the relay S2' is now in engagement with the fixed contact 189', this voltage controls the time duration of the negative pulse developed at the cathode 155' of the tube V12', the beginning of which coincides with the t. c. s. pulses received over the conductor 127'.

Meanwhile, printing character space signals are being supplied to the blanking circuit 87' over the conductor 82' so that the t. c. s. pulses delivered to the conductor 127' lag the beginnings of the column width pulses by an amount proportional to the number of printing character pulses received. More particularly, the guiding pulses delivered to the conductor 190' by the word space generator 92' will lag the beginnings of the column width pulses by an amount proportional to the total number of printing character space signals received, plus a time delay proportional to the accumulated word spaces up to that point.

It will be apparent, therefore, that the time elapsed from the beginning of a column width pulse to a guiding pulse is an accurate measure of the distance from the left hand column of the film strip 11 to the position thereon where the particular character being received at that instant should be printed for proper justification.

The guiding pulses from the word space generator 92' are transmitted over the conductor 190', through the fixed contact 191' engaging the movable contact 192 of the relay S5 (Fig. 2), and the conductor 45 to the galvanometer control circuit 19 (Fig. 4). The latter, meanwhile, is receiving position pulses from the amplifier 27 over the conductor 28. If the position pulses coincide with the guide pulses, the galvanometer mirror 15 is in a correct printing position for the character to be printed and it receives no resultant current from the galvanometer control circuit 19.

If, however, the guiding pulses either lag or lead the position pulses, the galvanometer control circuit 19 supplies current of the proper polarity to the galvanometer winding 16 to move the mirror 15 to the correct position. The desired character may then be printed on the film strip 11 in any desired manner such as that described in the above-mentioned copending application.

VIII. *Modification of word space delay generator*

Figure 8:
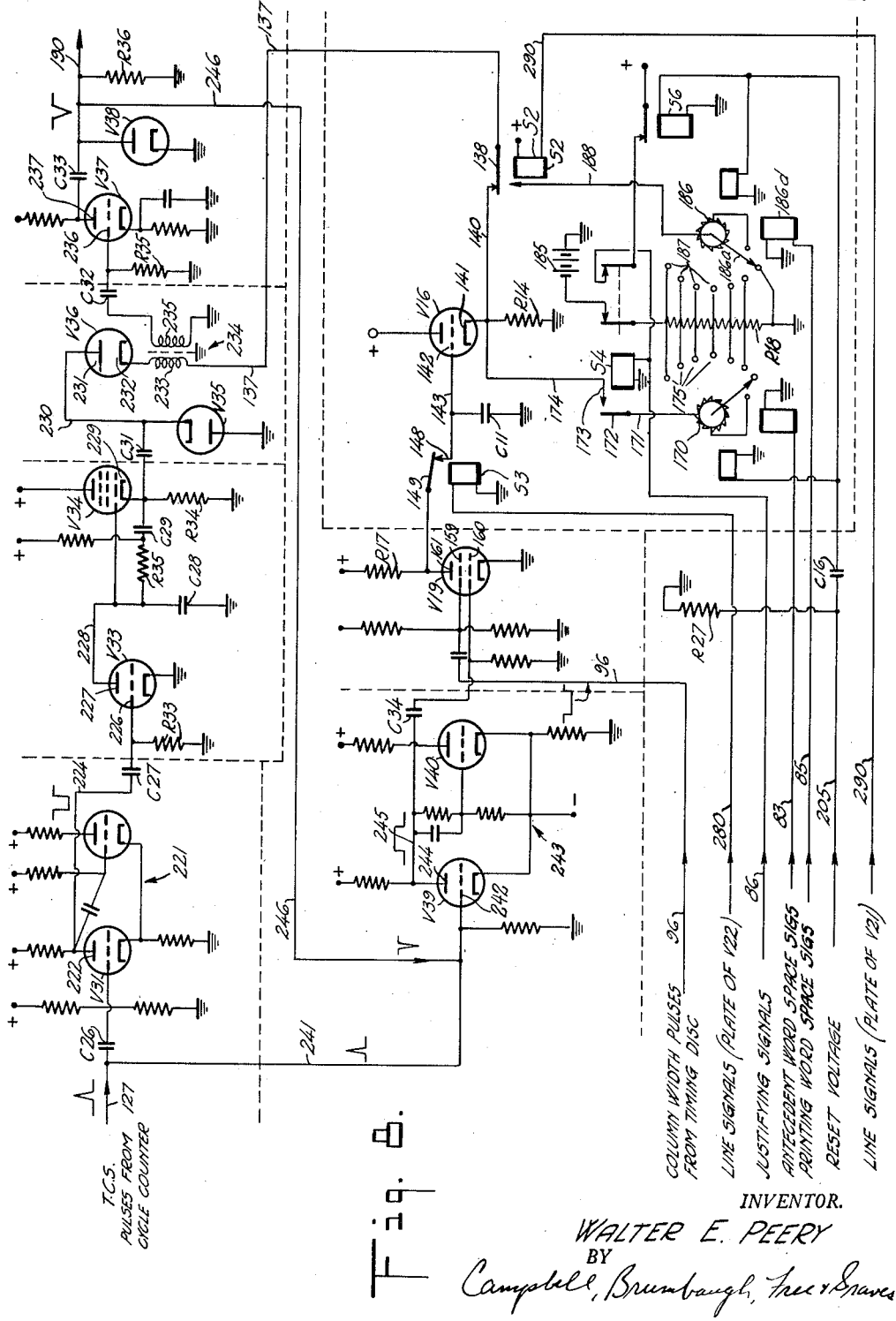
Fig. 8 is a schematic diagram showing a preferred modification of a portion of the circuit shown in both Figs. 2c and 3b, called the Word Space Delay Generator.

Instead of the specific word space delay generator 92 or 92' (Figs. 2c or 3b), a circuit of the type shown in Fig. 8 may be employed. In this embodiment, the t. c. s. pulses are delivered from the conductor 127 and through the condenser C26 to a conventional, one pulse multivibrator circuit 221 which produces a negative control pulse at the plate electrode 222 of the tube V31. This negative pulse is coupled through a conductor 224 and a condenser C27 to the control grid 226 of a tube V33, a grid leak R33 being connected between the grid 226 and ground, as shown. The plate 227 of the tube V33 is connected by a conductor 228 to a condenser C23.

The tube V33 normally has a low plate-cathode resistance and it provides a short circuit for the condenser C28 except during the negative control pulse delivered by the multivibrator 221. While the negative control pulse is being applied to the grid 226 of the tube V33, the condenser C28 is being charged by means including the tube V34 which has a cathode resistor R34 and the cathode 229 which is connected through a condenser C29 and a resistor R35 to one side of the condenser C28. The tube V34 and the elements associated therewith comprise essentially a cathode follower connected so as to supply a constant charging current to the condenser C28 for the purpose of securing a nearly linear saw-tooth wave output. Circuits of this type are disclosed in prior British Patent No. 493,843 to Newsam and a detailed description thereof need not be given herein.

The saw-tooth voltage output developed across the resistor R34 is supplied through a condenser C31 and a conductor 230 to the anode 231 of a diode V36. The cathode 232 of the tube V36 is connected through the primary winding 233 of a transformer 234 to the conductor 137 which leads to the movable contact 138 of the relay S2. It will be understood, therefore, that the cathode 232 of the tube V36 receives the potential developed across the resistor R14 in the cathode circuit of the tube V16, which is proportional to the interval between the t. c. s. pulse and the ending of the column width pulse.

The saw-tooth output appearing at the cathode 229 of the tube V34 performs a detecting function in that space current does not begin to flow in the anode-cathode circuit of the tube V36 until the plate potential of the latter reaches that of the cathode 232. When that happens, a corresponding saw-tooth voltage is developed across the secondary winding 235 of the transformer 234, one end of which is grounded and the other end of which is connected to a differentiating circuit comprising the condenser C32 and a resistor R35. The differentiated output from the transformer secondary winding 235 is applied to the grid 236 of a tube V37 which serves to amplify and invert the signal.

Since differentiation of the voltage wave output from the transformer secondary winding 235 gives its rate of change, and since the rate of change is greatest at the cross-over point (being constant at all other times except during the return period which is not involved in the operation of the circuit), a pulse is generated whose leading edge occurs simultaneously with the cross-over time. This pulse is amplified by the tube V37 and is further differentiated by the differentiating circuit comprising the condenser C33 and the resistor R36 connected to the plate 237 thereof. As a result, a very short pulse occurs at the cross-over point which is delivered to the conductor 190 and it constitutes the guiding pulse referred to hereinabove.

The tube V35 is a diode which serves as a "clamping tube" to maintain the base or starting value of the saw-tooth wave constant at zero voltage. The tube V38 is a diode which short circuits the positive elements of the pulse output appearing at the plate 237 of the tube V37, leaving only the desired negative pulse which is transmitted to the conductor 190. The transformer 234 is used as a loading device in the cathode circuit of the tube V36 to prevent fluctuations in the voltage applied to the cathode 232 of the tube V36 from entering the grid circuit of the amplifier tube V37. It will be understood that the signal output at the secondary winding 235 of the transformer 234 is responsive only to the cathode current in the tube V36.

Figure 9:
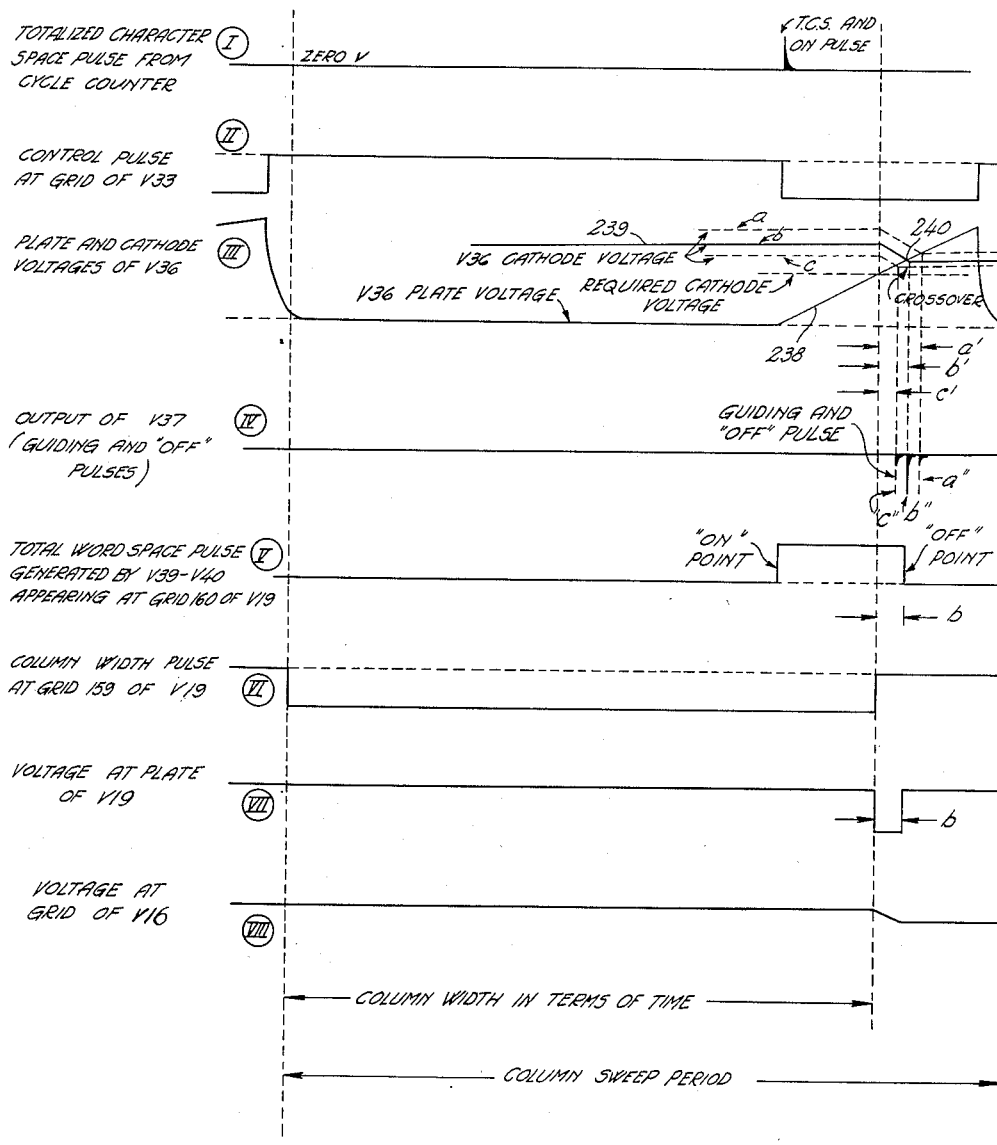
Fig. 9 is a diagram showing the time relationships in the operation of the justifying cycle of the system incorporating the circuit of Fig. 8.

For a better understanding of the operation of the circuit shown in Fig. 8 during the justifying data determining cycle, reference is made to Fig. 9. In line I of Fig. 9, is shown a t. c. s. pulse as delivered from the conductor 127 to the multivibrator tube V31. This produces a negative output pulse of the form shown in line II which is delivered to the grid 226 of the tube V33. The curve 238 in line III of Fig. 9 shows the saw-tooth wave voltage which is applied to the anode 231 of the tube V36, while the curve 239 represents the voltage applied to the cathode 232 from the resistor R14 in the cathode circuit of the tube V16. At the cross-over point 240 (line III of Fig. 9), a short guiding pulse is produced in the output of the tube V37, as shown in line IV.

The t. c. s. pulse delivered at the conductor 127 is also transmitted through the conductor 241 (Fig. 8) to the grid 242 of a triode V39 in a conventional type pulse generator 243. The output of the pulse generator 243 appears at the plate 244 of the tube V39 and it is transmitted through a conductor 245 and a condenser C34 to the grid 160 of the discriminator tube V19.

Once the t. w. s. (total word space) pulse has been initiated by the receipts of t. c. s. (total character space) pulse at the grid 242 of the tube V39, it continues until a guiding pulse is transmitted to the grid 242 from the conductor 190 through the conductor 246. Thus, the pulse output of the pulse generator 243 will be as shown in line V of Fig. 9 which will overlap the end of the column width pulse (line VI) by an amount "b." Since the grid 159 of the discriminator tube V19 also receives column width pulses over the conductor 96, the tube V19 conducts only during the overlapped portion "b" of the pulse shown in line V, as shown in line VII. This reduces both the charge on the condenser C11 and the voltage across the resistor R14, as shown in line VII of Fig. 9, thus reducing the voltage applied to the cathode 232 of the tube V36 and bringing the cross-over point closely to the end of the column width pulse until the two substantially coincide.

Figure 10:
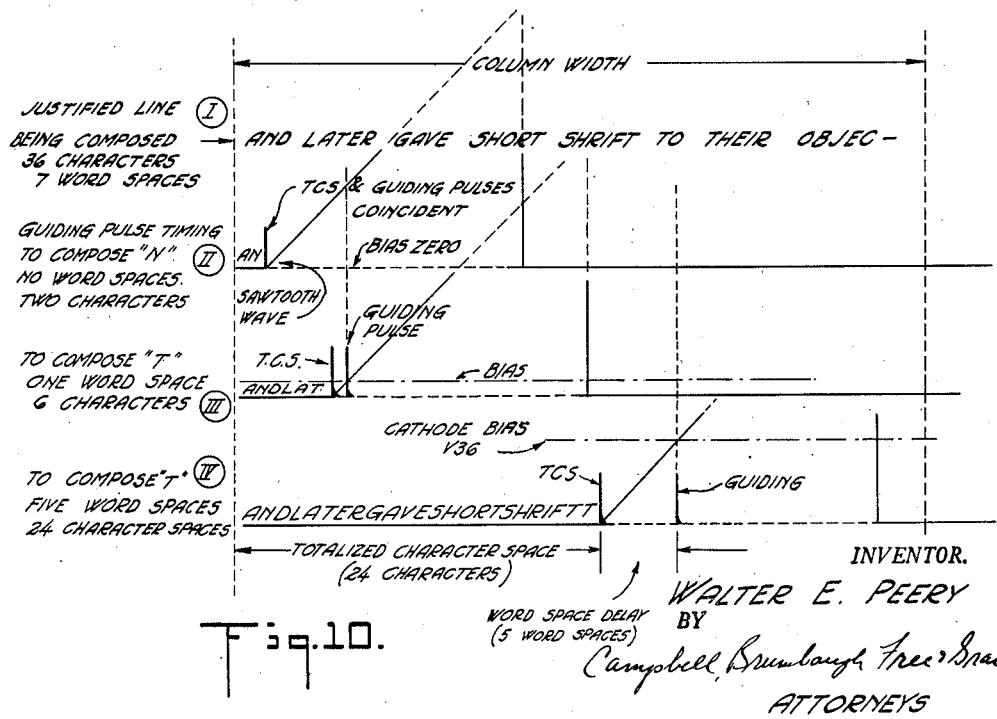
Fig. 10 is a diagram showing the time relationships in the composing cycle of the system incorporating the circuit of Fig. 8.

The functions performed by the modification shown in Fig. 8 during the composing cycle may be better understood from the curves given in Fig. 10 which show the time relationships between the several events taking place. At the start of the composing cycle, the relay S3 is energized, breaking the contacts 148 and 149, so that the condenser C11 is disconnected from the discriminator circuit. Under these conditions, the voltage across the condenser C11 remains constant at the value determined during the justification data determining cycle.

During the composition of a line, word space signals delivered to the relay 186d of the stepping switch 186 advance the movable contact arm 186a along the taps 187 on the resistor R18, thus raising the bias applied to the cathode 232 of the tube V36 and inserting progressively longer delays between the t. c. s. and guiding pulses.

By way of example, consider the justified line.

"ANDLATERGAVESHORTSHRIFTTOTHEIR-
OBJEC-"

as illustrated in line I of Fig. 10. During the composing of the first word "AND" (line II), no word space delay is needed and the t. c. s. and guiding pulses, therefore, must coincide. No printing word space signals have been received by the electromagnet 186d of the stepping switch 186, so that the movable contact arm 186a remains in engagement with the first tap 187 and zero voltage is applied to the cathode 232 of the tube V36. The guiding pulse, therefore, is generated at the beginning of the saw-tooth wave.

In composing the letter "T" of the word "LATER" (line III), the t. c. s. pulse has moved over the proper amount to accommodate the accumulated character spaces. One printing word space signal will have been received so that the movable contact arm 186a of the stepping switch 186 will engage the second tap 187, applying to the cathode 232 of the tube V36 one-seventh of the total bias voltage developed across the resistor R14 (there are seven word spaces in the line being composed). The guiding pulses are, therefore, delayed with respect to the t. c. s. pulses by the amount of time taken for the saw-tooth voltage to rise to this value.

At the time of composing the letter "T" in the word

"TO" (line IV of Fig. 9), five-sevenths of the bias voltage developed across the resistor R14 will be applied to the cathode 232 of the tube V36 so that the word space delay and the totalized character space will be as shown in line IV.

It will be understood from the foregoing, that the invention provides a novel and highly effective system for positioning characters in a photocomposing system or the like in justified lines. By virtue of the combination of electro-mechanical elements employed, the positioning of the mirror 15 in response to code signals on the tape 10 may be accomplished accurately at extremely high rates of speed.

The several embodiments described above and shown in the drawings are given merely by way of illustration and it will be readily understood that they may be modified considerably within the scope of the invention. These embodiments, therefore, are not to be regarded as limiting in any way the scope of the following claims.

I claim:

1. A system for composing type characters in lines of text matter of preestablished length, including photographic recording means, a signal generator for providing signals defining recurrent time intervals having durations representative of line-lengths, a pulse generator for providing recurrent pulses, means for phasing each pulse with respect to a time interval to indicate as a function of time the physical position of a character in its line, the last said means including means for progressively summing the accumulated space allotted to preceding characters, and means governed by the phasing of said signals and pulses for establishing the position of each character in its designate position in the line on the photographic recording means.

2. A system for justifying a line of characters in composition including means defining a time interval representing designate line-length as a function of time, means measuring off a portion of said time interval to represent the space in the line consumed by the physical displacement of the characters therein in the direction of the line as a function of time, and means responsive to the difference in time between said time interval and the said portion thereof representing character displacement for defining as a function of time the space in the line allocated to spaces between groups of one or more characters.

3. In a system for justifying a line of type characters, means for establishing signals defining a time interval representing the preestablished length of a line to be filled by characters and spaces between character groups comprised of one or more characters, pulse generating means for establishing a pulse normally occurring at the beginning of said time interval, means responsive to the sum of the type characters to be disposed in a line for delaying the occurrence of said pulse by an amount corresponding in time to the physical space occupied by the line of characters without character group spaces, means responsive to the time between the occurrence of the pulse and the ending of the said time interval for generating a voltage proportional thereto, means for dividing the voltage by the total number of spaces between successive groups of characters, thereby to produce a quotient voltage which is a function of the space to be inserted between successive character groupings to yield a justified line, and printing means responsive to said voltage for spacing successive character groups in a printing operation by said amount.

4. In a system for photocomposing type characters including a photosensitive strip, means for selecting a succession of characters to be reproduced upon said strip, and means for establishing and projecting images of selected characters upon said strip in photocomposition, the combination of control means for governing the projection of said characters, comprising record means carrying first information representing in succession the physical space occupied by each character and second information representing in succession the space between character groups of one or more characters, means for producing signals defining recurrent time intervals of uniform duration representing line-length as a function of time, pulse generating means for producing recurrent character space pulses initially coincident with the beginning of said time intervals, means responsive to said first information for delaying the occurrence of said character space pulses relatively to said time intervals by cumulative amounts corresponding to the space occupied by the characters without word spaces, means responsive to said second information to generate pulses spaced in time from corresponding character space pulses by cumulative amounts representing spaces between character groups, and means responsive to said latter pulses for energizing said control means to project successive character images onto said photosensitive strip in spaced relationship.

5. In a system for justifying a line of type characters formed in spaced apart word groupings, the combination of means for establishing recurrent pulses defining a succession of time intervals each representing in duration the length of a line, means for generating a succession of character space pulses, one corresponding to each of said time intervals and normally coincident with the beginning thereof, first indicia means representing the characters in the line, means responsive to said first indicia means for successively delaying the occurrence of said character space pulses by an amount corresponding to the cumulative summation of the character spaces without word spaces, means for developing pulses each of which has its beginning coincident with a corresponding character space pulse and each having a duration indicative of totalized space between words, means for modifying the pulse representing all of the word spaces in the line to have its ending coincident with the ending of the time interval representing line-length, thereby to yield a signal representing the space in the justified line allocated to spacings between words, and means for utilizing said word space signal to control the insertion of word spaces to compose a justified line of characters.

6. In the method of justifying a line of type characters having word spaces between successive character groups comprised of one or more characters, the steps of representing the total desired line-length by a first time interval, developing a second time interval which, relative to said first time interval, represents the total space occupied by the characters in the line, comparing said first and second time intervals and developing a third time interval representing the difference therebetween, and utilizing said third time interval to control the insertion of word spaces in a composing operation.

7. In the method of justifying a line of type characters having word spaces between successive character groups comprised of one of more characters, the steps of representing the total desired line-length by a first time interval, developing a second time interval which, relative to said first time interval, represents the total space occupied by the characters in the line, comparing said first and second time intervals developing a value proportional to said difference between the first and second time intervals, and dividing said value by the number of word spaces in the line to produce a value representing the word space to be inserted in a composing operation.

8. The method for justifying a line of type characters comprising, representing the desired line-length by a given time interval, assigning to each of the respective type characters which comprise the line time increments bearing a relationship to the said line-length time interval which is proportional to the physical space occupied by said character in the composed line, summing the time increments of the respective characters, the summation of said increments yielding a total time differing from the line-length time interval by an amount representing the summation of the desired spacings between successive character groups of one or more characters, measuring the said time difference between said line-length time interval and the summation of individual character space time increments, and dividing the said time difference by the number of requisite spaces between character groups to yield a time increment bearing a relationship to the line-length time interval which corresponds to the allotted physical space between character groups in the justified line.

9. The method for justifying a line of type comprising representing the desired line-length by a given time interval, assigning given type characters comprising the composed line time increments bearing a relationship to said line-length time interval corresponding to the physical space occupied by said characters in the composed line, the summation of the time increments for the characters being preestablished to yield a random time interval differing within preestablished limits from the line-length time interval, said difference corresponding to the summation of desired spacing between character groups of one or more characters, measuring the said time difference, generating a signal proportional thereto, and dividing said signal into shorter signals which correspond in number to the number of spaces required between character groups in the composed line and which represent such spaces between character groups as will yield a justified line.

10. The method of justifying a line of type characters, said line normally occupying, as a consequence of the physical displacement of the characters therein plus preestablished standard spacings between successive character groups comprised of one or more characters, a length differing from the desired line-length, the method comprising representing the total desired line-length by a first time interval, developing a second time interval which, relative to said first time interval, represents as a function of time the total space in the line required to accommodate the characters without character group spaces, comparing said first and second time intervals to determine the difference therebetween, producing a voltage proportional to said difference, and dividing said voltage by the number of spaces between character groups in the line, thereby to yield a quotient voltage indicative of the space between successive character groups, and utilizing said voltage to control the positioning of characters.

11. In combination, a first movable member; motive means for positioning said member throughout a given range of movement; first signal generating means including photoelectric means, illuminating means for energizing the photoelectric means, a moving element interposed in the light path between said photoelectric means and said illuminating means to vary the light input to the photoelectric means to establish a succession of signals defining recurrent time intervals of uniform duration, each representing as a function of time the magnitude of the range of movement of said movable member; second signal generating means including illuminating means, photoelectric means energized by the illuminating means, a moving element interposed in the light path between the photoelectric and illuminating means to establish recurrent position pulses in the former at a rate corresponding to the rate of said time intervals; means responsive to the position of said movable member for controlling the phase relationship of each of said position pulses with respect to its corresponding time interval, thereby representing as a function of time the present position of said movable member in its range of movement; guide pulse generating means for providing at least one pulse in phase relationship with said time interval as indicative of a desired position of said member; and control means responsive to both said guide and position pulses for energizing said motive means to drive said member to a position corresponding to that of the said guiding pulse.

12. In combination, light source means, and photoelectric means disposed to receive light therefrom, a moving element interposed in the path of light from said source to said photoelectric means, said moving element being provided with alternate portions for permitting and preventing impingement of light from said source upon said photoelectric means to cause a succession of pulses defining recurrent time intervals of uniform duration to be generated therein, adjustable means disposed in the light path between the source and said moving element for shaping said light beam passing to the latter thereby to change the duration of said pulses, second photoelectric means, light source means for energizing said second photoelectric means, a movable member having a given range of positions, means associated with said member and disposed in the light path from said source to said second photoelectric means for directing a beam of light from the source to the said moving element, the point of impingement of said beam upon said moving element being dependent upon the position of said movable member in its range of positions, said moving element being constructed and arranged to alternately pass and prevent passage of said beam to said second photoelectric means thereby to cause pulses to be generated in the latter in phase relationship to the time interval defined by the pulses of said first photoelectric means indicative of position of said member in its range of positions.

13. In combination, a movable member having a given range of movement and means for indicating present position of said member throughout its range of movement, including, first and second photoelectric means and energizing light source means therefor, a moving element interposed in the path of energizing light to the said two photoelectric means, said moving element being provided with alternate portions for periodically varying the quantity of light impinging on said photoelectric means to cause pulses to be generated therein, means interposed between the light source means and said moving element for forming a relatively wide beam of light for energizing the first of said photoelectric means, said wide beam of light being traversed by successive portions of said moving element to permit relatively long light flashes to reach said first photoelectric means to cause to be generated therein recurrent first pulses representative of the magnitude of the range of movement of said movable member, means associated with said movable member for movement therewith and interposed between said light source and said moving element for directing a beam of light for energizing said second photoelectric means, said beam being traversed by successive portions of said moving element to permit light flashes of relatively short duration to reach said second photoelectric means thereby to cause to be generated therein short second pulses, the timing of each of which is dependent upon the position of said movable member in its range of movement, each of said second pulses being representative, relatively to said first pulses, of present position of said movable member.

14. In combination, photoelectric means and an energizing light source therefor, a moving element interposed in the path of light from the source to the photoelectric means and having portions for varying the amount of light impinging upon said photoelectric means to cause voltage pulses to be generated therein, a magnetic portion carried by said moving element having a plurality of cycles of a base frequency recorded thereon, induction coil means disposed in inductive relationship with said magnetized portion carried by said moving member, said induction means having induced therein a plurality of cycles of base frequency for each pulse generated by said photoelectric means thereby to provide means for dividing said pulse into a plurality of parts.

15. In combination, in a timing system, a rotating disc having a plurality of circumferentially spaced radial slots adjacent its periphery, first and second photoelectric means disposed adjacent said disc to receive light passing through said slots, first means disposed on the opposite side of said disc from said first photoelectric means for forming a relatively wide band of light to be traversed successively by said slots for exposing the first of said photoelectric means to a succession of light flashes of relatively long duration to develop pulses of corresponding duration therein, second means disposed on the opposite side of said disc from said second photoelectric means for projecting a beam of light onto said disc to be traversed by successive slots for exposing said second photoelectric means to a succession of light flashes of relatively short duration to develop pulses of corresponding duration therein, a movable member having a preestablished range of movement the magnitude of which is represented by the pulses of said first photoelectric means, means responsive to the position of said movable member for changing the point of impingement of said beam of light circumferentially of said disc thereby to change the phase relationship of the pulses generated by said second photoelectric means relatively to those of said first photoelectric means, the phase relationship of corresponding pulses from said first and second photoelectric means being indicative of position of said movable member among its range of positions.

16. In combination, in a timing system, a rotating disc having a plurality of circumferentially spaced radial slots adjacent its periphery, first and second photoelectric means disposed adjacent said disc to receive light passing through said slots, first means disposed on the opposite side of said disc from said first photoelectric means for forming a relatively wide band of light to be traversed successively by said slots for exposing the first of said photoelectric means to a succession of light flashes of relatively long duration to develop pulses of corresponding duration therein, second means disposed on the opposite side of said disc from said second photoelectric means for projecting a beam of light onto said disc to be traversed by successive slots for exposing said second photoelectric means to a succession of light flashes of relatively short duration to develop pulses of corresponding duration therein, a movable member having a range of movement the magnitude of which is represented by the pulses of said first photoelectric means, means responsive to the position of said movable member for changing the point of impingement on said disc of the beam of light for energizing said second photoelectric means, thereby to change the phase relationship of the pulses generated by said second photoelectric means relatively to those of said first photoelectric means, the phase relationship of corresponding pulses from said first and second photoelectric means being indicative of position of said movable member among its range of positions, means for generating guide pulses phased with respect to the pulses of said first photoelectric means and indicative of a desired position of said movable member, and motive means for said member responsive to guide pulses and to pulses of said second photoelectric means to move said member to a predetermined position.

17. In combination, a rotating disc having a plurality of circumferentially spaced radial slots, an annular magnetic portion carried by said disc having magnetically recorded thereon in the angular distance between each pair of adjacent slots a plurality of constant frequency signals, induction coil means for having induced therein by said magnetically recorded signals a plurality of constant frequency signals, means for projecting a first strip of light against said disc to be traversed by said slots, first photoelectric means responsive to the light flashes from said strip of light in passing through the moving slots to produce a succession of pulses of relatively long duration, means for projecting a beam of light against said disc also to be traversed by said slots, second photoelectric means responsive to the light flashes from said second line of light passing through said slots to produce a succession of pulses of relatively short duration, a movable member having a given range of movement represented in magnitude by the duration of the pulses of said first photoelectric means, means responsive to the changing position of said member for displacing the point of impingement of said beam of light circumferentially of said disc thereby to change the phase relationship of said pulses of said second photoelectric means relatively to those of the first photoelectric means, control means providing information for governing the movement of said movable member, motive means for said member, and means responsive to signals from said control means, from said first and second photoelectric means and from said induction means for energizing said motive means.

18. In combination, a source of radiation, means for forming a shaped beam from the radiation source, a radiation interrupter, means for establishing relative movement between the shaped beam and the interrupter to form therefrom a succession of radiation pulses each having a duration which is dependent upon the beam shape, means providing a second radiation beam to be acted upon by the said interrupter to form a succession of radiation pulses corresponding in frequency to the pulses from the shaped beam but of short duration relatively thereto, means for establishing relative movement between the shaped beam and the second beam in response to a given function, the limits of the function being defined in terms of time by the duration of each of the pulses from the shaped beam, whereby the phase relationship between the pulses of longer duration and the corresponding second pulses of shorter duration is indicative of the relative movement between the shaped and second beams.

19. The combination as set forth in claim 18, said interrupter comprising a rotary member having a plurality of radially disposed radiation-transparent openings, said means for providing a shaped beam being adjustable and constructed and arranged to form a beam having a variable dimension transverse with respect to the radial openings but not exceeding the chord distance between the two successive openings, whereby the passage of one opening past the beam results in a pulse of relatively long duration, said second beam impinging on the rotary member to result in a short duration pulse each time the beam is traversed by an opening.

20. In combination, a light interrupter, a movable member having a given range of movement, a source of light and means for directing a shaped beam of light from said source to the interrupter to provide a succession of light pulses of equal duration, the duration of each of said pulses being determined by the shape of said beam, the duration of each of the pulses also representing as a function of time the magnitude of the range of movement of said movable member, means for providing a second beam of light to impinge on said interrupter and resulting in light pulses corresponding in frequency to the pulses from the shaped beam, but of short duration relatively thereto, each of the short duration pulses coming within a corresponding pulse from the shaped beam, means responsive to the movement of said movable member for establishing relative movement between the shaped and second beams impinging on the interrupter whereby the phase relationship between the light pulses formed by the interrupter is changed, the phase relationship being indicative of the position of said member in its range of movement.

21. The combination as set forth in claim 20, said light interrupter comprising a rotary disc having a plurality of circumferentially spaced radial slots, said movable member comprising a light reflector for said second beam of light pivoted on an axis disposed in a plane forming an angle with the axis of rotation of the disc, whereby pivotal movement of the member moves the reflected light beam transversely of the radius of the disc at the point of impingement of the reflected light beam on the disc, said means for forming a shaped beam of light comprising an aperture plate, the aperture in which is adjustable in magnitude to alter the shape of the light beam transversely with respect to the radial slots in the disc, whereby the shaped beam of light is adjustable to represent the magnitude of the range of pivotal movement of the movable member, the pulses resulting from the second beam of light bearing a time relationship to the relatively longer pulses from the shaped beam of light representing the position of the movable member within its range of movement.

22. The combination as set forth in claim 21, including photo-composing means movable with said light reflector to compose successive character images on a photosensitive surface, and photoelectric means responsive to the said light pulses from the said shaped and second beams for providing electrical signals which are utilized in composing characters.

23. In a system for controlling the composition of a line of type characters, first signal generating means for producing a series of signals defining recurrent time intervals of uniform duration representing line-length, voltage generating means for providing a voltage having a magnitude proportional to the total amount of space in the line allocated to spacing between character groups, means responsive to said voltage for producing a pulse having a duration which relatively to said time interval represents as a function of time the total amount of space in the line allocated to spacing between character groups.

24. In a system for composing a succession of type characters in a line, the combination of record means carrying first indicia representative of space consumed in the line by each character and second indicia representing space between successive character groups of one or more characters, means for generating a succession of pulses defining recurrent time intervals representative of line-length, at least one time interval being provided for each character to be composed in the line, means responsive to said first indicia for producing at least one character space pulse for each character and bearing a phase relationship to the corresponding time interval indicative as a function of time of the amount of space in the line consumed by that character plus all of the characters preceding that character in the line, and means responsive to said second indicia for delaying each character space pulse by an amount representative as a function of time of the sum of all of the spaces between character groups which precede that character in the line, thereby to provide at least one guiding pulse for each character which bears a phase relationship to the time interval corresponding thereto representative of the desired position of that character in the line, and means controlled by each of said guiding pulses for positioning the character corresponding thereto in its required position in the line during composition.

25. A system for successively photocomposing type characters in a line, including a photosensitive strip, means for forming and projecting type character images upon said strip, and means for controlling the projected positions of type character images on said strip, said means including record means carrying control indicia severally representative of character displacement space and spacing between character groups of one or more characters, means for generating a succession of signals defining recurrent time intervals representing the line-length, means responsive to said control indicia for generating a succession of totalized character space pulses each representing as a function of time in conjunction with said time interval the amount of space in the line consumed by the linear displacement of the character corresponding thereto plus the linear displacement of all of the preceding characters, means responsive to said control indicia representing spacing between character groups for providing a succession of cumulatively totalized character group space voltages each representative in magnitude of the sum of the spaces between character groups preceding the corresponding character in the line, a pulse generator initiated by said totalized character space pulses and controlled by said totalized character group space pulses for providing a succession of pulses each having a duration dependent upon the magnitude of the corresponding totalized character group space voltage and representing as a function of time relatively to said time interval the cumulative space in the line consumed by spacing between character groups preceding the character in composition.

26. A system for successively photocomposing type characters in a line, including a photosensitive strip, means for forming and projecting the character images upon said strip, and means for controlling the projected positions of said characters in said strip, said means including record means carrying control indicia severally representative of character displacement space and spacing between character groups of one or more characters, means for generating a succession of signals defining recurrent time intervals representing the line-length, means responsive to said control indicia for generating a succession of totalized character space pulses each representing as a function of time in conjunction with said time interval the amount of space in the line consumed by the displacement of the character corresponding thereto plus the displacement of all of the preceding characters in the line, means responsive to said control indicia representing spacing between character groups for providing a succession of totalized character group space voltages each representative in magnitude of the sum of the spaces between character groups preceding the corresponding character in the line, a pulse generating system for providing a succession of guide pulses each initiated by a corresponding totalized character space pulse, said pulse generating system being responsive to the magnitude of each totalized character group space voltage for delaying the time of occurrence of the corresponding guide pulses by a time interval representing the accumulated spacing between character groups preceding that character in the line, each of said guide pulses thereby representing relatively to a corresponding time interval the desired position of the corresponding character in the line.

27. A system for successively photocomposing type characters in a line including a photosensitive strip, means for forming and projecting type character images for photoimpression on said strip, and means for controlling the projected positions of said characters on said strip, said means including record means carrying control indicia severally representative of character displacement space and spacing between character groups of one or more characters, means for generating a succession of signals defining recurrent time intervals representing the line-length, means responsive to said control indicia for generating a succession of totalized character space pulses each representing as a function of time in conjunction with said time interval the amount of space in the line consumed by the displacement of the character corresponding thereto plus the displacement of all of the preceding characters in the line, means responsive to said control indicia representing spacing between character groups for providing a succession of cumulatively totalized character group space voltages each representative in magnitude of the sum of the spaces between character groups preceding the corresponding character in the line, a pulse generator initiated by said totalized character space pulses and controlled by said totalized character group space pulses for providing a succession of pulses each having a duration dependent upon the magnitude of the corresponding totalized character group space voltage and representing as a function of time relatively to said time interval the total space in the line consumed by spacing between character groups preceding that character, means for differentiating the output pulses of said pulse generator to provide a succession of relatively short guide pulses each representing by its phase relationship to said time interval the required position of the corresponding characters in the line.

28. In a system for composing a succession of type characters in a line, the combination of record strip bearing indicia severally representative of character spaces and of word spaces, signal generating means providing a series of signals defining recurrent time intervals of uniform duration representative of line-length, means cumulatively responsive to said character space indicia for providing at least one totalized character space pulse for each of said time intervals, each pulse bearing a phase relationship to its corresponding time interval indicative of cumulative space consumed by the characters then composed in the line, a resistor and means providing a voltage drop thereacross, a stepping switch responsive to said word space signals for picking off cumulative voltage increments from said resistor representing cumulative word space, the sum voltage of said increments representing a totalized word space voltage, a pulse generator initiated by each of said totalized character space pulses and responsive to corresponding totalized word space voltages to produce a succession of pulses each having a duration representing relatively to said time interval the cumulative word space in said line.

29. In combination, an electronic device having an output circuit including electrode means, a voltage source and load resistor, a control input circuit for controlling the current flow in said output circuit thereby to provide controlled voltage drops across said resistor, a first pulse generator providing random pulses, a second pulse generator, means connecting the voltage developed across said resistor to said second pulse generator, said second pulse generator being constructed and arranged to provide pulses each initiated by a corresponding random pulse and having a duration dependent upon the magnitude of the voltage developed across said resistor, an electronic gating device, means connecting the output of said second pulse generator to said gating device, third pulse generating means providing third pulses each of a preestablished duration and means connecting the gating device to receive said third pulses, said gating device being constructed and arranged to provide an output pulse upon the occurrence of a preestablished phase relationship between said third pulse and the output pulse from said second pulse generator, and means connecting the output pulse from said gating device to the control circuit of said electronic device for changing the magnitude of the voltage developed across said resistor.

30. In combination, an electronic device having an output circuit including electrode means, a source of voltage and a load resistor, an input circuit for controlling the current flow in said output circuit thereby to provide controlled voltage drops across said resistor, a first pulse generator providing random pulses, a second pulse generator, means connecting said second pulse generator to receive the voltage across said resistor and to receive said random pulses, said second pulse generator being constructed and arranged to provide output pulses each initiated by said random pulses and having a duration dependent upon the magnitude of the voltage developed across said resistor, an electronic gating device, means connecting the output of said second pulse generator to said gating device, third pulse generating means providing third pulses each of a preestablished duration, means connecting said gating device to receive said third pulses, said gating device being constructed and arranged to provide an output pulse upon the occurrence of a preestablished phase relationship between corresponding pulses from said second pulse generator and said third pulse generator, and means connecting the output pulse from said gating device to the control circuit of said electronic device for changing the magnitude of the voltage developed across said resistor, a differentiating circuit connected to receive the output pulse from said second pulse generator and adapted to yield a relatively short duration pulse at substantially the termination of each pulse output from said third pulse generator.

31. A system for photocomposing a line of type characters including photosensitive means and means for forming and projecting images of said type characters upon said photosensitive strip, and means for controlling the projection of said character images, including a record strip carrying indicia severally representative of character spaces and the spaces between words, first pulse generating means providing pulses defining recurrent time intervals of uniform duration representative of line-length, second pulse generating means responsive to said indicia representing character space for providing a pulse for each character to be composed timed with respect to a corresponding time interval to represent in a function of time the space consumed by said each character and the characters preceding it in the line, a resistor and control means for establishing a flow of current therethrough, scanning means for said indicia representative of word space, a stepping switch responsive to signals from said scanning means to pick off cumulative voltage increments from said resistor to secure a totalized word space voltage, a voltage generator, means connecting said voltage generator to receive said totalized character space pulses and to receive said totalized word space voltage, said voltage generator being constructed and arranged to provide output pulses initiated by each of said totalized character space pulses and having a duration proportional to the magnitude of the corresponding totalized word space voltage picked off said resistor, and means for differentiating the output from said voltage generator to secure a guiding pulse phased with respect to said time interval to indicate as a function of time the desired position in the line of the character corresponding to said each guiding pulses.

32. In a system for justifying a line of type characters in photocomposition including photosensitive means and means for selecting, forming and projecting images of said type characters upon said photosensitive strip, the improvement comprising means for controlling the projected positions of said character images, including a record strip carrying indicia severally representative of character spaces and the spaces between words, signal generating means providing pulses defining recurrent time intervals of uniform duration representative of line-length, scanning means for said indicia for providing signals representative of character space, pulse generating means responsive to said character space signals for providing a pulse for each character, each pulse being phased with respect to a corresponding time interval to represent as a function of time the space consumed by the character corresponding thereto plus all characters preceding it in the line, a resistor, control means for establishing a voltage drop across said resistor, scanning means for said indicia for providing signals representative of word space, a stepping switch responsive to said word space signals to pick off cumulative voltage increments from said resistor to secure a totalized word space voltage, a voltage generator, means connecting said voltage generator to receive totalized character space pulses and to receive said totalized word space voltage, said voltage generator being constructed and arranged to provide output voltages each initiated by a totalized character space pulse and having a duration proportional to the magnitude of the totalized word space voltage corresponding thereto as picked off said resistor, a gating device and means connecting the output of said voltage generator and the said pulse representing said line-length thereto, said gating device being constructed and arranged to provide an output pulse when the duration of a voltage pulse from said voltage generator exceeds the termination of the corresponding line-length pulse, means connecting the pulse output from said gating device to said control means providing a voltage drop across said resistor to decrease said voltage drop by an amount causing the voltage output from said voltage generator to terminate substantially at the time of termination of the line-length pulse.

33. A system for positioning an element throughout a range of movement thereof including means providing a first pulse proportional in duration to the magnitude of the range of movement of the element, means for producing a short duration second pulse phased randomly with respect to said first pulse and indicative relatively thereto of a desired position of said element as a function of time, means responsive to position of said element for generating a short duration third pulse phased with respect to said first pulse and indicative of present position of said element as a function of time, and means responsive to phase differences between said second and third pulses for positioning said element in a position wherein a preestablished phase relationship between said second and third pulses obtains.

34. A system for positioning an element throughout a range of movement thereof including motive means for said element, means for providing a succession of pulses defining recurrent time intervals each proportional in duration to the magnitude of the range of movement of the element, means for producing a short duration second pulse disposed within the first pulse to represent as a function of time a desired position of said element in its range of movement, signal generating means responsive to the position of said element within its range of movement for generating a succession of short duration third pulses, each occurring within a corresponding time interval to represent as a function of time present position of said element, and means responsive to a phase difference between a second pulse and a corresponding third pulse for energizing said motive means to move said element to a point wherein a preestablished phase relationship between the second and third pulses obtains.

35. In a system for positioning an element throughout a range of movement thereof, motive means for said element, signal generating means for producing first signals defining a sequence of time intervals representing as a function of time the magnitude of the range of movement of said element, second pulse generating means responsive to the position of said element in its range of movement for producing a short duration second pulse occurring in phase relationship with the beginning of said time interval as indicative of physical position of said element in its range of movement, pulse generating means responsive to preconceived indicia for generating a third pulse of relatively short duration to occur in phase relationship with the beginning of said time interval indicative as a function of time of a desired position of said element within its range of movement, and means responsive to preestablished differences in phase of said second and third pulses for energizing said motive means to position said element in its range of movement in a position corresponding to the phase relationship between said third pulse and the beginning of said time interval.

36. In a photocomposing system for type characters, a photosensitive strip, a light controlling member for governing the positions of successively formed character images on said strip, motive means for displacing said member progressively to govern the positions of respective characters on the strip, control means providing a signal representing desired position of said member, means responsive to position of said member for providing a signal representing present position of said member, and means responsive to a phase difference between said signals for energizing said motive means for moving said member to a position at which a given preestablished time relationship between said signals obtains, thereby to control the successive points of impingement of character images on said photosensitive strip.

37. In a system for photocomposing type characters including a photosensitive strip, control indicia record means and character image selecting means responsive to said control indicia, the improvement comprising means for projecting character images onto said strip in response to said control indicia, including a movable light controlling member for positioning character images on the photosensitive strip, electromotive means for said member, first signal generating means for producing signals defining recurrent time intervals of uniform duration each representative of line-length, means responsive to said control indicia for developing at least one guiding pulse for each character, each of said guiding pulses bearing a time relationship to a corresponding one of said time intervals indicative of physical position of said character in its line, and means responsive to the timing relationship of said guiding pulses for controlling said electromotive means to drive said character positioning member to a position wherein the presently projected character image is disposed in its line in a physical position corresponding to the time relationship between the guiding pulse corresponding to the character image and said time interval, thereby to control the successive points of impingement of character images on said photosensitive strip.

38. In a system for photocomposing type characters including a photosensitive strip, control indicia record means and character image selecting means responsive to said control indicia, the improvement comprising means for projecting character images onto said strip in response to said control indicia, including a movable light controlling member for positioning character images on the photosensitive strip, electromotive means for said member, first signal generating means for producing signals defining recurrent time intervals of uniform duration each representative of line-length, means responsive to said control indicia for developing at least one guiding pulse for each character, each of said guiding pulses bearing a time relationship to a corresponding one of said time intervals indicative of physical position of said character in its line, means responsive to the position of said movable character positioning member for generating a position pulse bearing a time phase relationship to said time interval indicative of the present position of said member, and means responsive to a phase difference between corresponding guiding and position pulses for energizing said electromotive means to displace said character positioning member, thereby to control the successive points of impingement of character images on said photosensitive strip.

39. In a system for photocomposing type characters in lines, a photosensitized strip, a movable member having a first reflecting surface for projecting character images onto said strip for photoimpression thereon, a control system for said member comprising means generating signals defining recurrent time intervals representing line-length, means for developing a succession of first pulses representing successively required positions of said member as a function of time relatively to said time interval, a second reflecting surface associated with said member, a light source and means for receiving said light from said source as reflected from said second reflecting surface, said receiving means including means responsive to the angle at which the light is reflected for generating second pulses indicative of position of said member as a function of time relatively to said time interval, motive means for said member, and means responsive to said first and second pulses for energizing said motive means to move said member into successive positions as indicated by said first pulses.

40. In a control circuit for positioning a movable member, electromotive means operatively connected to said member, a first pair of electronic tubes each having a control electrode, first pulse generating means connected as an input to the control electrode of one of said tubes, second pulse generating means connected as an input to the control electrode of the other tube, means connected to both of said tubes enabling either to fire individually upon receipt of an input pulse on its control electrode, electrical connections between said first pair of tubes wherein one is extinguished upon firing of the other, a second pair of electronic tubes corresponding to said first pair and each having control electrodes, means responsive to the firing of either of said first pair of tubes for applying a gating pulse to the control electrode of the corresponding one of said second pair of tubes, third pulse generating means connected to the control electrodes of each of said second pair of tubes, either of said second tubes being adapted to fire only upon concurrent receipt on its grid electrodes of third pulses and gating pulses, and polarized electrical connections between said electromotive means for said member and said second pair of tubes whereby firing of one of the second pair of tubes causes said electromotive means to drive said member in one direction, and firing of the other drives in the opposite direction.

41. In a system for photocomposing type characters, a photosensitive strip, character image projecting means, and a control circuit for governing the projection of character images including a movable member, galvanometer motive means including a coil connected in driving relationship to said member and having a pair of input terminals, a first pair of gas discharge devices each having plate, grid and cathode electrodes, a capacitance connection between said plate electrodes, first pulse generating means adapted to produce cyclically recurrent pulses connected to the grid of one of said devices, guide pulse generating means connected to the grid of the other device, each of said devices being connected to fire upon receipt of a pulse at its grid and upon firing to extinguish the other of said devices, a second pair of gas discharge devices having plate, grid and cathode electrodes, electrical connections between the plate circuits of each of said first pair of devices and the grids of a corresponding one of said second pair of devices for applying upon alternate firing of said first devices corresponding alternate gating voltages to the respective grids of said second devices, third pulse generating means connected to the grids of each of said second devices, either or both of said second devices being adapted to fire upon concurrent receipt of said gating voltage and a third pulse, means connecting one terminal of said coil to receive electrical energy from the plate circuit of one of said second devices and means connecting the other terminal of said coil to receive electrical energy from the plate circuit of the other of said devices.

42. In a system for composing type characters in justified lines, the combination of record means carrying control indicia, first and second computing and control means each adapted to perform selectively the operations of determining justifying data or of providing signals for composing type characters in justified lines, first and second scanning means for scanning said record means simultaneously at different places to provide control signals for said computing and control means, and switching means responsive to said indicia for connecting said first and second computing and control means each to receive alternately signals from said first and second scanning means, whereby the respective functions of determining justifying data for a line and providing signals for composing the justified line are performed in reverse alternation by said computing and control means.

43. In a system for composing a line of justified type characters, means providing a voltage prior to composition of the line representative of total space between words in the line, a voltage divider for said voltage, means responsive to the total number of spaces between words for setting up said divider to provide voltage increments representing word spaces, electromagnetic means for setting said divider to zero, a source of electrical energy, means connecting said electromagnetic means to said source of electrical energy including a capacitance and a switch, said electromagnetic means being adapted to be energized upon closing of said switch, thereby to return said divider to zero, and a resistor connected to said capacitance for discharging the latter upon opening of said switch, said electromagnetic means being inoperative to set said voltage divider to zero upon discharging of said capacitance.

44. In combination, a first pulse generator providing pulses representing by their duration uniform recurrent time intervals, a second pulse generator providing at least one pulse randomly disposed in time within a corresponding time interval pulse, a sawtooth wave generator initiated by each of said random pulses to provide sawtooth waves each having its beginning substantially coincident with the corresponding initiating pulse, a third pulse generator, a voltage generator responsive to pulses from said third pulse generator for providing an output voltage, a detecting circuit and means connecting the voltage outputs of said sawtooth wave generator and said voltage generator thereto, said detecting circuit being constructed and arranged to conduct a current at such time as the voltage of the sawtooth wave exceeds that of the voltage generator, means responsive to a flow of current in said detecting circuit for developing a fourth pulse spaced in time from said second pulse by an amount dependent upon the magnitude of the voltage from said voltage generator and the slope of said sawtooth wave, a fifth pulse generator initiated by said random pulses for providing variable duration fifth pulses, means connecting said fifth pulse generator to receive said fourth pulses, said fifth pulse generator being adapted to have its output pulse terminated upon receipt of a said fourth pulse, a gating circuit connected to receive said fifth pulses and said time interval pulses, said gating circuit being constructed and arranged to provide an output pulse when said fifth pulse exceeds the termination of a corresponding one of said time interval pulses, and means connecting the output of said gating circuit to said voltage generator, said voltage generator being adapted to provide an output voltage governed by the output of said gating device which is of such value that the output of said fifth pulse generator is terminated at substantially the same time as the termination of the corresponding time interval pulse.

45. In a system for photocomposing a line of type characters including photosensitive means and means for forming character images to be projected upon said strip, the invention comprising means for controlling the projection of character images including record means carrying indicia severally representative of character space and of word space, signal generating means providing a series of pulses of uniform duration representative of recurrent uniform time intervals each indicative of line-length, scanning means for said character space indicia for providing signals representative as a function of time relatively to said time interval of the amount of space in the line-length consumed by character spaces, a tapped resistor and means for establishing a given voltage drop thereacross, scanning means responsive to said word space indicia for providing signals representative of word space, a stepping switch responsive to the signals representing word space for picking off cumulative voltage increments from said resistor, said cumulative voltage increments representing in magnitude the amount of space in the line consumed by word space, means responsive to the magnitude of said voltage representative of word space and initiated by said signals representative of character space for providing totalized word space pulses having durations representative of word space, a gating device comprising an electronic tube having plate, grid and cathode electrodes, means connecting said grid to receive totalized word space pulses, means connecting said grid to receive time interval pulses, means connecting said cathode to ground, and means connecting said plate to a source of positive potential such that the tube is rendered conducting for such time as the duration of said totalized word space pulse on its grid exceeds the termination of a corresponding time interval pulse, and means responsive to the flow of current in said tube for reducing the said given voltage drop across said resistor.

46. In a method for composing a series of type characters in a line of text matter in a predetermined sequence in a line of text matter, the steps of representing line length by a time interval of a given duration, representing the position of each character in the line as a function of time by establishing for each character a time interval of relatively shorter duration within the given time interval, and utilizing the several time relationships between the two intervals to compose the characters in the line.

47. In a photocomposing system, means for providing column width signals defining time intervals which are proportional in duration to the length of a line of characters, means providing character space signals within said time intervals representing as a function of time in conjunction with the time intervals the amount of space in the line taken up by the characters, and means responsive to said column width signals and to said character space signals for providing a value representative of the difference between column width intervals and the character space intervals, said difference value representing space in the line available for use as spaces between words.

48. In a photocomposing system, means for providing column width signals defining time intervals which are proportional in duration to the length of a line of characters, means providing character space signals within said time intervals representing as a function of time in conjunction with the time intervals the amount of space in the line taken up by the characters, and means responsive to said column width signals and to said character space signals for providing a value representative of the difference between column width intervals and the character space intervals, said difference value representing space in the line available for use as spaces between words, said means providing the difference value comprising a capacitance, means for charging said capacitance, means responsive to the charge on said capacitance and to the signals representing character space for providing a signal having a duration representative of totalized spaces between words in the line, and discriminator means for discharging said capacitance at such times as the charge thereon represents a value differing from available space between words in the line.

49. Apparatus as set forth in claim 48, said means for providing a signal having a duration representative of totalized spaces between words in the line comprising means responsive to signals representing character space for providing sawtooth waves, unidirectional conducting means having one terminal connected to receive said sawtooth waves, and a voltage source responsive to the charge on said capacitance connected to another terminal of said unidirectional conducting means, said conducting means being constructed and arranged to pass current only upon receipt of voltages of preestablished relationships from said means providing sawtooth waves and said voltage source.

50. Apparatus as set forth in claim 48, said means for providing a signal having a duration representative of totalized spaces between words in the line comprising a multivibrator initiated by said character space signals, a sawtooth wave generator responsive to the output of said multivibrator and providing sawtooth waves each initiated by the output of said multivibrator, a source of voltage controlled by the charge on said capacitance, a detecting circuit and means connecting the voltage from the source thereto, means connecting the output voltage of said sawtooth wave generator to said detecting circuit, said detecting circuit being constructed and arranged to conduct a current when the voltage of said source is less with respect to ground than the output voltage of the sawtooth wave generator, and means responsive to a flow of current in said detecting circuit for providing a signal spaced in time from a corresponding character space signal by an amount proportional to the slope of the sawtooth wave and the magnitude of the voltage from said source.

51. In combination, a capacitance, means for charging the capacitance, means providing first pulses representative of a first quantity, means providing signals phased with respect to the first pulses to represent a second quantity, means responsive to the charge in the capacitance and to said signals representative of the second quantity for providing pulses representative of a third quantity and phased with respect to the first pulses, and discriminator means responsive to the first and second pulses for discharging the capacitance by amounts bringing the charge thereon to a value establishing and maintaining a preestablished phase relation between the endings of the first and second pulses, said first and second pulses being rectangular.

52. Apparatus as set forth in claim 51, said first rectangular pulses representing the length of a line of characters as a function of time, said signals phased with respect to the first pulses representing as a function of time the amount of space in the line of characters consumed by totalized character displacement, and said second rectangular pulses representing as a function of time the amount of space in the line length available for spaces between groups of charatcers in the line.

53. In a photocomposing system for composing groups of characters in lines, in combination, a radiation interrupter, first and second sources of radiation for use with the interrupter, means for establishing a first relative movement between the interrupter and both of the sources simultaneously, first radiation-responsive means for receiving interrupted radiations from the first source to provide first signals defining time intervals representing the lengths of lines, second radiation-responsive means for receiving interrupted radiations from the second source to provide second signals bearing a time relationship to the first signals to represent positions of individual characters in the lines, and means for establishing a second relative movement only between said interrupter and the second radiation source, thereby to change the time relationship between the first and second signals to represent the positions of successive characters in the lines as a function of time.

54. In a system for composing a line of type characters for a line of text matter, photographic recording means, first signal generating means for producing a series of signals defining recurrent time intervals of uniform duration, each time interval representing length of the line, means for producing recurrent signals at least one of which occurs within each defined time interval and each of which is phased relatively to its corresponding time interval to represent position of a character in the line as a function of time, the said interval between the beginning of the recurring time interval and the character-positioning signal representing the physical distance between the beginning of the line and the position of the character in the line, and means responsive to the relative phasing between said position signals and said time interval signals for establishing the position of each character in succession in its designate position in the line on the photographic recording means.

55. In an apparatus for positioning type characters in succession in a line of photographically composed type, first generator means to provide a first series of signals defining recurrent time intervals, the beginning of each representing, in time measurement, the beginning of a line of characters, second generator means to provide a second series of signals defining recurrent time intervals subdividing each of the first series time intervals and representing, in time measurement, the width of type characters, counting means connected to receive the second signals to count the time intervals defined thereby and to furnish an output signal after a preestablished count designating the position the desired character is to occupy in the line of characters with respect to the beginning of a said first series time interval in terms of the second series time intervals, control means responsive to input control signals and associated with the counting means for varying the number of second series time intervals between the beginning of a first series time interval and the output signal of the counting means, and character printing means controlled by the counting means output signal.

References Cited in the file of this patent

UNITED STATES PATENTS

| Number | Name | Date |
|---|---|---|
| 1,647,408 | Hunter | Nov. 1, 1927 |
| 1,732,049 | Hunter | Oct. 15, 1929 |
| 1,821,466 | Grass | Sept. 1, 1931 |
| 2,021,507 | Hanks | Nov. 19, 1935 |
| 2,027,026 | Dirkes et al. | Jan. 7, 1936 |
| 2,077,490 | Paris | Apr. 20, 1937 |
| 2,108,767 | Fitzgerald | Feb. 15, 1938 |
| 2,110,746 | Tolson | Mar. 8, 1938 |
| 2,176,720 | Rayner | Oct. 17, 1939 |
| 2,201,978 | Bedford | May 28, 1940 |
| 2,237,156 | Mathes | Apr. 1, 1941 |
| 2,252,083 | Luck | Aug. 12, 1941 |
| 2,257,763 | Petterson | Oct. 7, 1941 |
| 2,283,383 | McNaney | May 19, 1942 |
| 2,321,581 | Conover | June 15, 1943 |
| 2,329,137 | Richards | Sept. 7, 1943 |
| 2,335,265 | Dodington | Nov. 30, 1943 |
| 2,345,668 | Hallmark | Apr. 4, 1944 |
| 2,349,687 | Williams | May 23, 1944 |
| 2,379,862 | Bush | July 10, 1945 |
| 2,379,880 | Burgess | July 10, 1945 |
| 2,402,719 | Allison | June 25, 1946 |
| 2,403,609 | Perkins | July 9, 1946 |
| 2,407,336 | Young | Sept. 10, 1946 |
| 2,407,564 | Martin et al. | Sept. 10, 1946 |
| 2,408,754 | Bush | Oct. 8, 1946 |
| 2,412,111 | Wilson | Dec. 3, 1946 |
| 2,413,440 | Farrington | Dec. 21, 1946 |
| 2,415,591 | Henroteau | Feb. 11, 1947 |
| 2,420,509 | Whittaker | May 13, 1947 |
| 2,431,591 | Snyder | Nov. 25, 1947 |
| 2,443,195 | Pensyl | June 15, 1948 |
| 2,444,338 | Dimond | June 29, 1948 |
| 2,447,344 | Kliever | Aug. 17, 1948 |
| 2,450,360 | Schoenfeld | Sept. 28, 1948 |
| 2,474,192 | Schlesman | June 21, 1949 |
| 2,481,034 | Neufeld | Sept. 6, 1949 |
| 2,486,866 | Morgan et al. | Nov. 1, 1949 |